United States Patent [19]

Miyoshi et al.

[11] Patent Number: 4,478,506
[45] Date of Patent: Oct. 23, 1984

[54] ELECTROSTATIC COPYING APPARATUS HAVING IMPROVED COPY SHEET TRANSFER ARRANGEMENT

[75] Inventors: Yoshitake Miyoshi, Nara; Kiyoshi Shibata; Toshio Watanabe, both of Osaka; Masami Kai, Nara; Yousuke Ohata, Osaka, all of Japan

[73] Assignee: Mita Industrial Company Limited, Osaka, Japan

[21] Appl. No.: 464,065

[22] Filed: Feb. 4, 1983

Related U.S. Application Data

[62] Division of Ser. No. 220,721, Dec. 29, 1980, Pat. No. 4,386,845.

[30] Foreign Application Priority Data

Dec. 29, 1979 [JP] Japan .................. 54-173526
Dec. 29, 1979 [JP] Japan .................. 54-181555[U]
Feb. 29, 1980 [JP] Japan .................. 55-26914[U]
Mar. 21, 1980 [JP] Japan .................. 55-36726
Apr. 15, 1980 [JP] Japan .................. 55-49854

[51] Int. Cl.³ ............................ G03G 15/00
[52] U.S. Cl. ...................... 355/3 SH; 355/3 TR
[58] Field of Search ............ 355/14 R, 3 TR, 3 SH, 355/3 R

[56] References Cited

U.S. PATENT DOCUMENTS 4,139,300  2/1979  Katayama et al. ............... 355/14 R
4,220,699  9/1980  Ishida et al. ..................... 355/3 TR Primary Examiner—R. L. Moses
Attorney, Agent, or Firm—Wenderoth, Lind & Ponack

[57] ABSTRACT

An electrostatic copying apparatus wherein a stationary original document image is projected onto a photosensitive member during movement of an optical device for exposing, and an electrostatic latent image formed on the photosensitive member is transferred onto a copy sheet and is fixed, comprising (a) a jam detecting means for immediately detecting a copy sheet being jammed on a transport path; and (b) a cleaning device for removing residual toner particles remaining on the photosensitive member by means of magnetic force and for storing the removed toner particles after transferring operation. According to this invention, an occurrence of jam is detected immediately, and thus a fault or an accident of the electrostatic copying apparatus due to jam is prevented from expanding.

4 Claims, 34 Drawing Figures

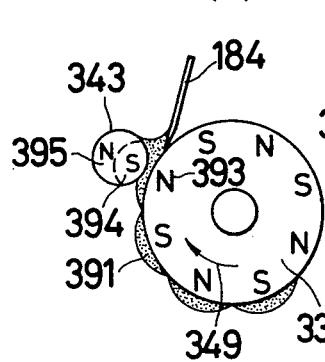
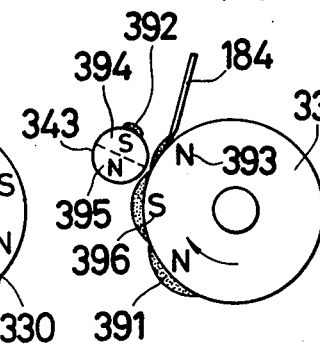
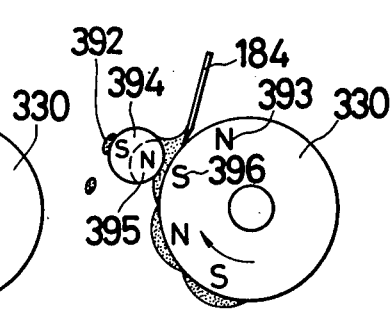
FIG. 29(1)   FIG. 29(2)   FIG. 29(3)
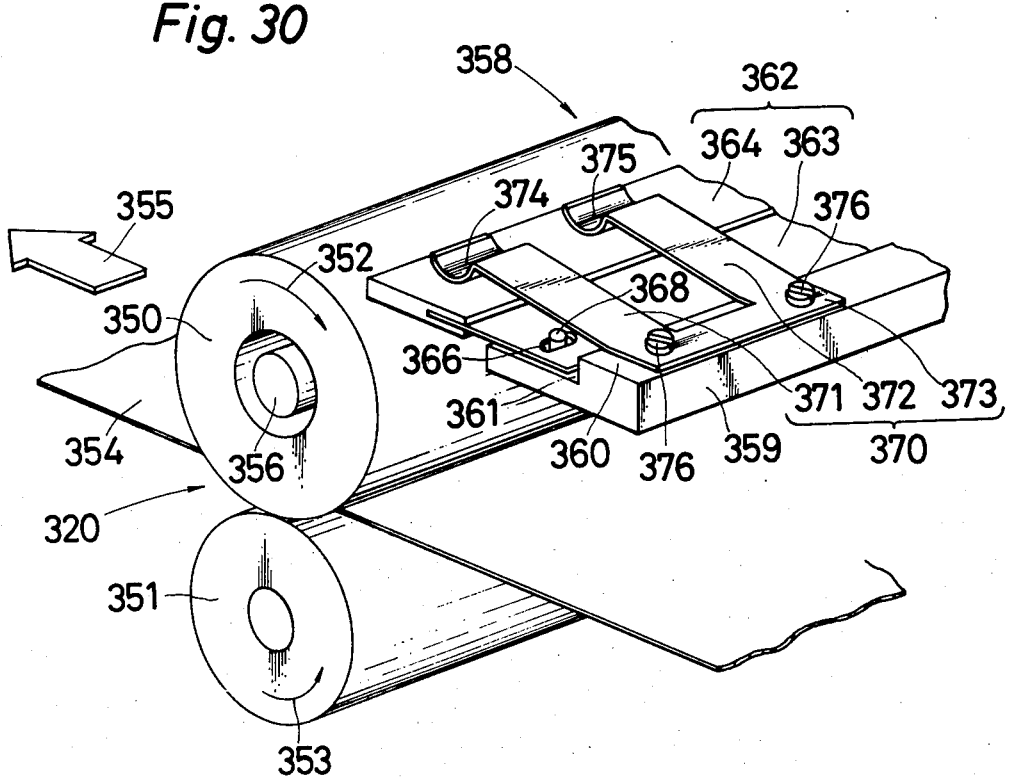
Fig. 30

ELECTROSTATIC COPYING APPARATUS HAVING IMPROVED COPY SHEET TRANSFER ARRANGEMENT

This is a division of Ser. No. 220,721, filed Dec. 29, 1980, now U.S. Pat. No. 4,386,845.

BACKGROUND OF THE INVENTION

1. Field of the Invention

The present invention relates to an electrostatic copying apparatus in which, after an electrostatic latent image of an original document is formed on a photosensitive member by exposure of the original document by a movable optical device, the image is transferred to a copy sheet and is fixed.

2. Description of the Prior Art

In a conventional electrostatic copying apparatus, the cycle of a copying operation is such that a copy sheet is supplied from a copy sheet feed means such as a feed cassette to a copy sheet transport path. Along this transport path a toner image on a photosensitive member developed by applying toner particles thereto is transferred to the copy sheet, and the copy sheet then is transported to a fixing device and is discharged. This transport path for transporting a copy sheet generally extends for a relatively long distance. In case of paper jamming along the long transport path, generally jamming is indicated visibly. Jamming is detected by means of only a few switches for detecting the copy sheet disposed along the transport path. Therefore, when jamming occurs, a copy sheet is damaged, a subsequent sheet is supplied in a multiple copy operation, or a jammed sheet is burnt in a heat fixing device, and thus further faults are inclined to develop.

It is an object of the invention to provide an improved electrostatic copying apparatus for solving technical problems as above-mentioned.

It is another object of the invention to release an apparatus housing easily so that a jammed sheet may be removed from a copy sheet transport path.

It is a further object to provide an improved display means for indicating jamming immediately.

It is a further object to prevent malfunction or troubles due to jamming from causing other faults within the electrostatic copying apparatus.

Another prior art apparatus comprises a cleaning device including a photosensitive drum whose surface is in contact with a furred brush for scraping residual toner particles remaining on a surface of the drum after completion of the transferring step. Therefore the furred brush injures the photosensitive drum.

A more particular object of the invention is to provide a new and improved transport means for causing magnetic toner particles to advance by their magnetic force so that mechanical members are not in contact with the photosensitive drum.

Generally, after transferring, residual toner particles on a photosensitive surface of the drum are cleaned by a cleaning device, and removed particles are stored in a sump. An operator has to release an apparatus housing every time so as to recognize whether the sump is full of removed toner particles. Such operation takes much time and is troublesome.

It is a still further object of the invention to provide an improved detecting device for detecting automatically the quantity of toner particles in the sump.

It is a further object of the invention to retain an adjustable charged surface of the photosensitive member and to reproduce a clear transferring image during each copying operation.

These and other objects will becomes more apparent from the following brief description and drawings.

SUMMARY OF THE INVENTION

To accomplish the foregoing objectives, there is provided an electrostatic copying apparatus wherein a stationary original document image is projected onto a photosensitive member during movement of an optical device for exposing the original, and an electrostatic latent image on the photosensitive member is transferred onto a copy sheet and is fixed, comprising (a) a jam detecting means for immediately detecting a copy sheet being jammed along a transport path; and (b) a cleaning device for removing residual toner particles remaining on the photosensitive member by means of magnetic force and for storing the removed toner particles after a transferring operation. According to this invention, the occurrence of a jam is detected immediately, and thus an accident in the electrostatic copying apparatus due to the jam is prevented from expanding.

According to a preferred embodiment, the jam detecting means comprises a plurality of detecting switches at short intervals along a copy sheet transport path. The jam detecting means comprises a detecting switch disposed immediately downstream in the copy sheet transport direction with respect to a position where the copy sheet is peeled off from the photosensitive member. A distance between a trailing edge of the copy sheet and a leading edge of a subsequent copy sheet along the copy sheet transport path is shortened when multiple copies are accomplished, so as to shorten the time required for a multiple copying operation. The cleaning means comprises a toner transport means which has (a) a magnet member electrically insulated from an apparatus housing, having circumferentially a plurality of magnetic poles and driven to rotate around its axis, and (b) a transport member made of magnetically permeable material and spaced from the magnetic member in a magnetic field of the magnetic member in parallel with the magnetic member.

An electrostatic copying apparatus comprises a toner detecting device for detecting the toner remaining in a sump to be used for the cleaning means. The toner attracted by magnetic force from an outer periphery of the photosensitive member is stored in the sump. A shaft extending along an inlet opening of the sump is pivotally mounted and has an internal portion which is in the sump and a protruding end out of the sump a responsive plate extends radially from and is secured to the shaft. In the case where toner is not stored in the sump, the responsive plate faces the inlet opening above the shaft and is stationary at an angle which allows the toner to slide downwardly along on the responsive plate. In the case where the toner is stored in the sump, the responsive plate pivots due to the weight of the toner. There is further provided a detecting means for detecting the angle of the responsive plate. Therefore the quantity of the toner particles in the sump is detected automatically and easy maintenance is performed.

In accordance with this invention, the copy sheet is guided between a pair of top and bottom guide plates so as to abut against a transferring zone of the photosensitive member and is transported by a transport means after completion of a transferring operation. The pair of guide plates are pivotally mounted around a horizontal shaft supported on an apparatus housing and are spring-biased to approach each other in the vicinity of a transferring zone. The transport means is mounted to a frame which is mounted on the apparatus housing downstream in the copy sheet transport direction to swing around a horizontal axis of the frame. The frame is supported by a supporting means which supports the frame upstream in the copy sheet transport direction with respect to the horizontal axis to maintain the frame horizontally. The bottom guide plate is downwardly biased so as to move away from the top guide plate in the vicinity of the transferring zone when the frame is pivotally swung around the horizontal axis downwardly.

In a preferred embodiment, a peeling click or cog is provided above the frame to peel off a copy sheet from the photosensitive member and is spring-biased around a horizontal axis toward the peripheral surface of the photosensitive member. There is provided means for biasing the peeling click to move away from the peripheral surface of the photosensitive member against the elastic force of the spring when the frame is operated to be swung downwardly. Therefore a copy sheet jammed in the copy sheet transport path is removed easily.

According to another aspect of this invention, the original document image formed on the photosensitive member is transferred to the copy sheet which is transported in contact with the photosensitive member. A member which contacts the copy sheet, at least a portion of which is in a transferring area, is electrically insulated from the apparatus housing. Therefore, electric charge on the copy sheet is prevented from escaping to the apparatus housing so as to perform an adequate and steady condition for transferring regardless of the electrical resistance of the copy sheet.

BRIEF DESCRIPTION OF THE DRAWINGS

A detailed description of the invention will be made with reference to the accompanying drawings wherein like numerals designate corresponding parts in the figures and wherein:

FIG. 23 is a simplified front view depicting movement of a peeling click;

FIG. 29 is a simplified side view depicting moving steps of toner particles with respect to a permanent magnet bar and a stay;

FIG. 30 is a simplified perspective view of a fixing device;

DETAILED DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention is best defined by the appended claims.

ENTIRE STRUCTURE

Figure 1:
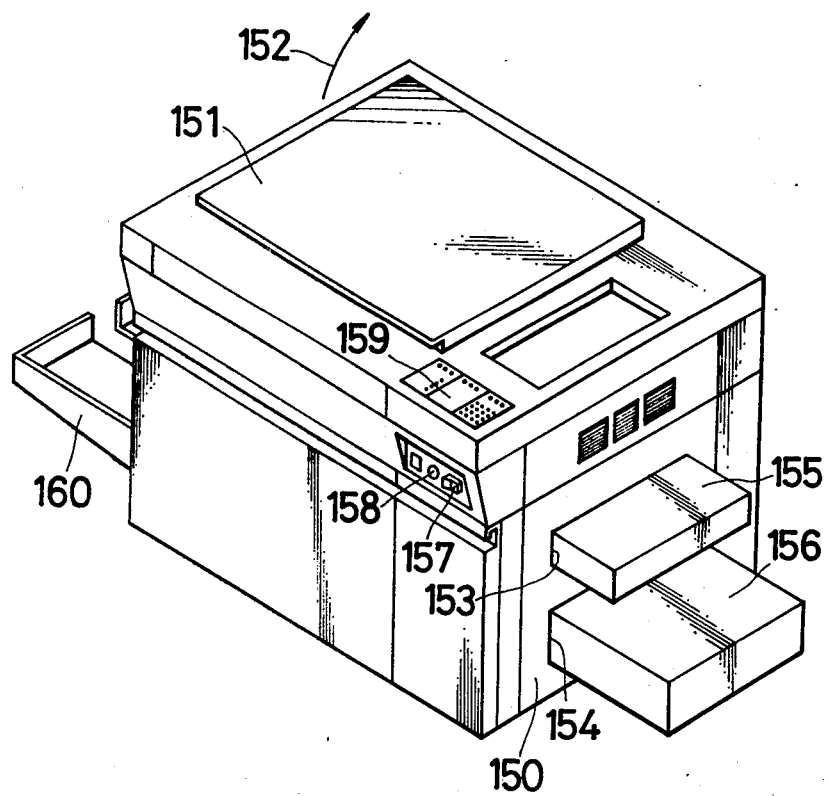
FIG. 1 is an overall perspective view of an electrostatic copying apparatus according to one preferred embodiment of the invention.

This electrostatic copying apparatus comprises a document cover lid 151 which is pivotally mounted to the top portion of an apparatus housing 150 to be swung upwardly in the direction of arrow 152 in FIG. 1. The document cover lid 151 allows easier placement of an original document to be copied on a plate surface of the apparatus housing 150. The apparatus housing 150 has on the right side two openings 153 and 154. Copy sheet cassettes 155 and 156 are arranged above and below, respectively, and are capable of being inserted in the openings 153 and 154 and of being removed therefrom.

The upper cassette 155 is adapted to store copy sheets of different sizes B4, B5, B6, A3, A4 and A5, which are according to Japanese Industrial Standard (JIS), and of Folio size. The lower cassette 156 is adapted to store copy sheets of different sizes B4, B5, A3 and A4. Two hundred fifty sheets (250) of paper can be stacked in the upper cassette 155, and five hundred sheets (500) of paper in the lower cassette 156. There are provided a power switch 157 and a power lamp 158 at the upper front portion of the apparatus housing 150. An operating display panel 159 is disposed to the top portion of the housing. When the power switch 157 is closed, the power lamp 158 turns on. Sequentially the operating display panel 159 is operated and a copying operation is accomplished. An original document image is transferred onto a copy sheet supplied from either of the copy sheet cassettes 155 or 156, and the copy sheet reproduced is advanced to a copy collection tray 160 accommodated on the left side wall of the apparatus housing 150.

ENTIRE OPERATION

Figure 2:
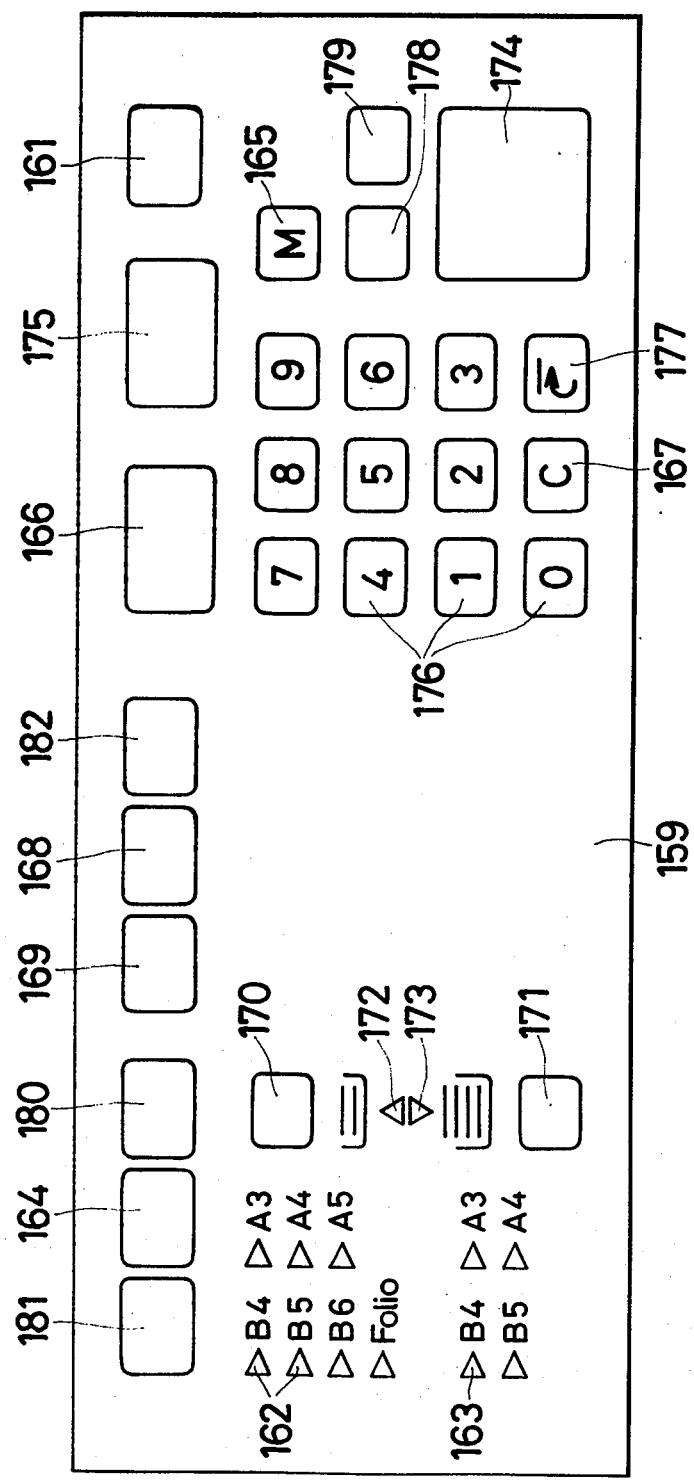
FIG. 2 is a plan view of an operating display panel thereof.

Referring to FIG. 2, a plan view of the operating display panel 159 is depicted therein in detail. When the power switch 157 (shown in FIG. 1 as aforementioned) is closed, the power lamp 158 turns on. Then, when a fixing device discussed below is rendered capable of fixing, a lamp 161 turns on. Either of a lamp 162 or 163 corresponding to the cassette 155 or 156 which stores the stack of copy sheets in pre-selected size turns on when the cassette 155 or 156 is installed into the apparatus housing 150. A lamp 164 turns on when the stack of the copy sheets are thoroughly consumed. When a number of multiple copies is to be set by a keyboard 176, a memory button 165 is pushed in advance. Accordingly a number of copies of two digits is displayed on a display station 166. A value inputted by keys or buttons of keyboard 176 is cleared by pushing a clear button 167. A display lamp 168 turns on when the store of toner particles in a developing device is entirely consumed. A display lamp 169 turns on when a sump 331 (refer to FIG. 24 and discussed below) for storing toner particles is filled with residual toner particles removed from the surface of a photosensitive drum 2 (refer to FIG. 3 and discussed below) wherein a cleaning step is performed after a transferring step is completed. With the notice of turning on the lamp 169, the operator may dump the toner particles removed in the cleaning step from the sump 331. By pushing either of a cassette select button 170 or 171 to select one of the cassettes 155 and 156, a lamp 172 or 173 corresponding to the selected cassette turns on and the selected cassette 155 or 156 can supply copy sheets for copying.

In a copying operation, a print button 174 is pushed. The number of copies on the display station 166 is continually reproduced. A number of copies to be reproduced is displayed on a display station 175 by the value of two digits. During a time when the pre-determined number of copies are being made, that is to say, when the reproduced number of copies, i.e. the number of the display station 175, is smaller than the pre-determined number of the display station 166 a copy operation of another original document can be introduced into the ordinary copying step by pushing an intrusion button 177. On pushing the intrusion button 177, an intrusion display lamp 182 turns on. Then, on pushing the print button 174, a copying operation is performed at the general standard level of copy density. To set for a thicker copy density of exposure, a print button 178 is pushed instead of the print button 174. To set for a thinner copy density of exposure, a print button 179 is pushed in place of the print buttons 174 and 178. When a paper jamming occurs along the copy sheet transport path, a display lamp 180 turns on and the copying operation is stopped. If a counter is provided to count the reproduced number of copies, a display lamp 181 keeps turning on.

COPYING OPERATION

Figure 3:
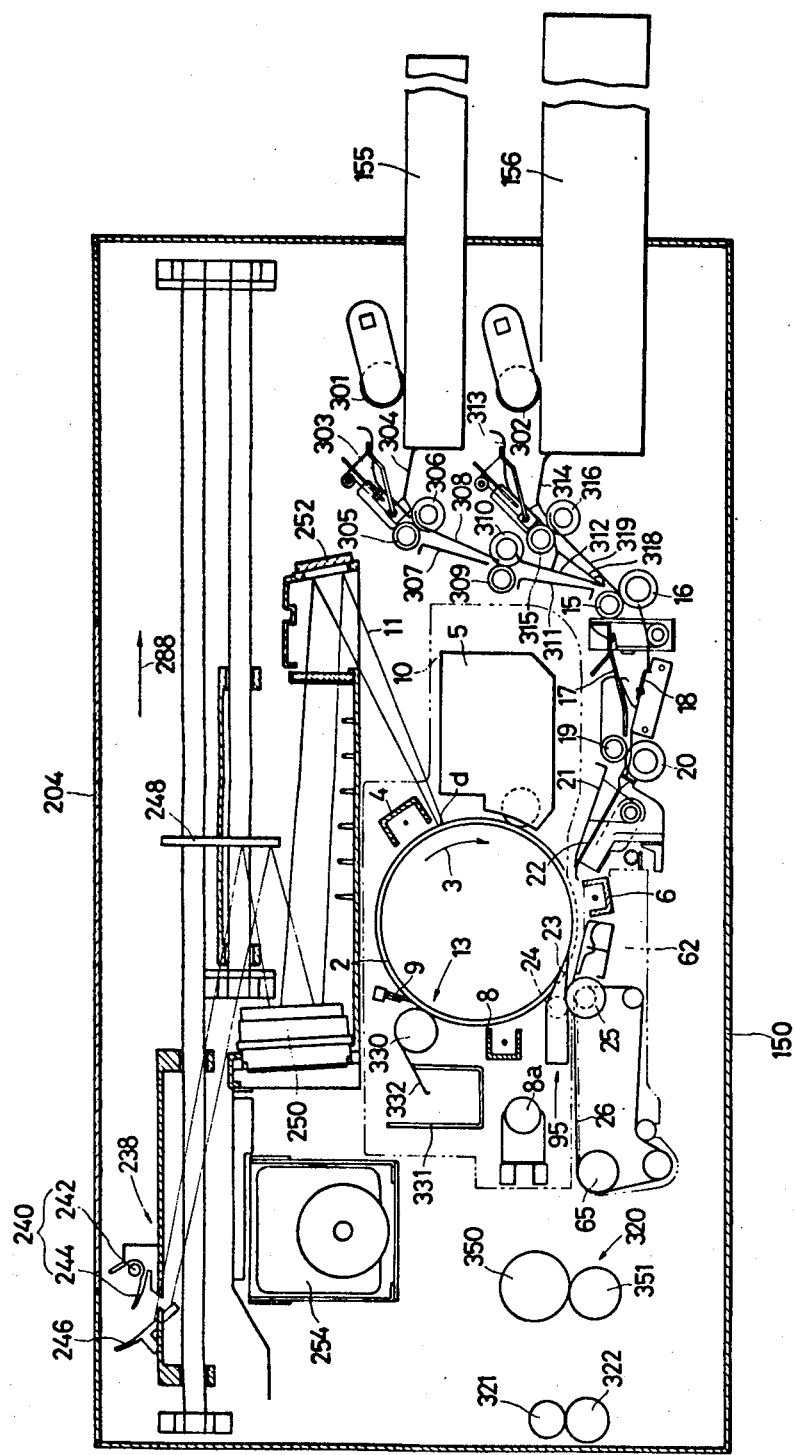
FIG. 3 is a schematic longitudinal sectional view as observed from the user.

FIG. 3 is a schematic longitudinal sectional view as observed from the side of the operator. A cylindrical drum 2, whose outer periphery is coated with a photosensitive layer, is rotatably positioned in the center of the apparatus housing 150. A corona charger 4 for charging the photosensitive layer of the drum 2, a magnetic brush developing device 5 for developing visibly an electrostatic latent image formed on the photosensitive layer of the drum 2, a transfer corona charger 6 for transferring the visible toner image onto a copy sheet, a peeling member 95 for peeling off the copy sheet from the drum 2 after completion of a copying operation, a charge erasing device 8 and a charge erasing lamp 8a for erasing a residual electric charge over the surface of the photosensitive layer, a cleaning device 13 and a blade member 9 are closely placed in turn along the rotational direction 3 over the periphery of the drum 2. The photosensitive drum 2, the corona charger 4, the magnetic brush developing device 5, the peeling member 95, the charge erasing device 8, the charge erasing lamp 8a, the cleaning device 13 and the blade member 9 are located in a retaining member 10, depicted by imaginary or dots-and-dash lines, which is movable reciprocally in the forward or backward directions, i.e. perpendicularly to the plane of FIG. 3.

OPTICAL DEVICE

An optical device 238 is mounted over the photosensitive drum 2. An original document image on a transparent plate 204 is projected onto the photosensitive layer of the drum 2 between the corona charger 4 and the magnetic brush developing device 5 as depicted by lines in FIG. 3. Therefore a light image is projected onto the charged surface of the photosensitive drum 2. In the optical device 238, a projector 240 comprises an exposure lamp 242 and a reflective plate 244. The light projected from the projector 240 through the transparent plate 204 and reflected therefrom onto the original document passes through a reflective mirror 246, a movable reflective mirror 248, an in-mirror lens 250 and another reflective mirror 252 to form the original document image onto the exposure zone "d" as shown at 11 in FIG. 3. During a copying operation, the projector 240 and the reflective mirror 246 are driven to move by a motor 254 from left to right in the direction of arrow 288 in FIG. 3. Then the movable reflective mirror 248 moves simultaneously from left to right at half the speed of the projector 240 as shown in FIG. 3.

Figure 4:
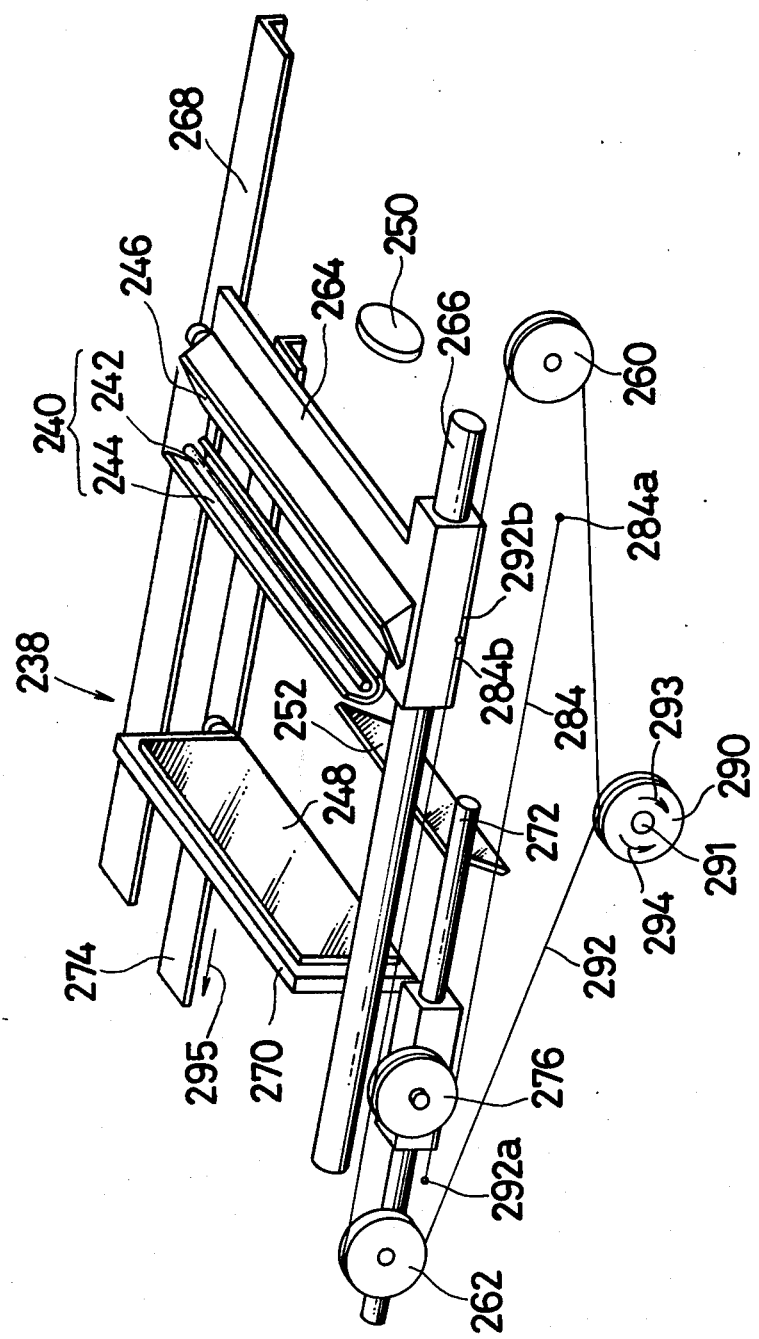
FIG. 4 is a simplified perspective view depicting the driving mechanism of an optical device.

FIG. 4 is a simplified perspective view depicting the projector 240, the reflective mirror 246 and the movable reflective mirror 248 as observed from the rear side of the apparatus housing 150. A pulley 290 driven by the motor 254 via a driving means (refer to FIG. 6), is rotatably supported by a rotary shaft 291 on the apparatus housing 150. Pulleys 260 and 262 having horizontal axes are disposed at a distance from each other on both sides of the apparatus housing 150. The projector 240 and the reflective mirror 246 are fixed to a supporting means 264. This supporting means 264 is guided and travels horizontally along a pair of guide members 266 and 268. A supporting member 270 which supports the movable reflective mirror 248 is guided and travels horizontally along a pair of guide members 272 and 274. A pulley 276 having a horizontal axis is supported by the supporting member 270. A wire 292 has an end 292a fixed to the apparatus housing 150, passes over half of the peripheries of the pulleys 276 and 262, one turn around the pulley 290, around half of the periphery of the pulley 260, and has another end 292b fixed to the supporting means 264. A wire 284 has one end 284a fixed to the apparatus housing 150, passes over half of the periphery the pulley 276, and has another end 284b fixed to the supporting means 264.

Accordingly, when the pulley 290 is driven to rotate in the direction of arrow 293, the supporting means 264 for supporting the projector 240 and the reflective mirror 246 are forwardly moved (toward the right in FIG. 3), and correspondingly the movable reflective mirror 248 moves in a parallel direction 295 at half the speed of the supporting means 264. When the pulley 290 is rotated in the direction of arrow 294, the supporting means 264 moves in the backward direction opposite to arrow 295 (toward the left in FIG. 3), and correspondingly the movable reflective mirror 248 moves in the same direction at half the speed of the supporting means 264.

TRANSPORTING A COPY SHEET

Figure 5:
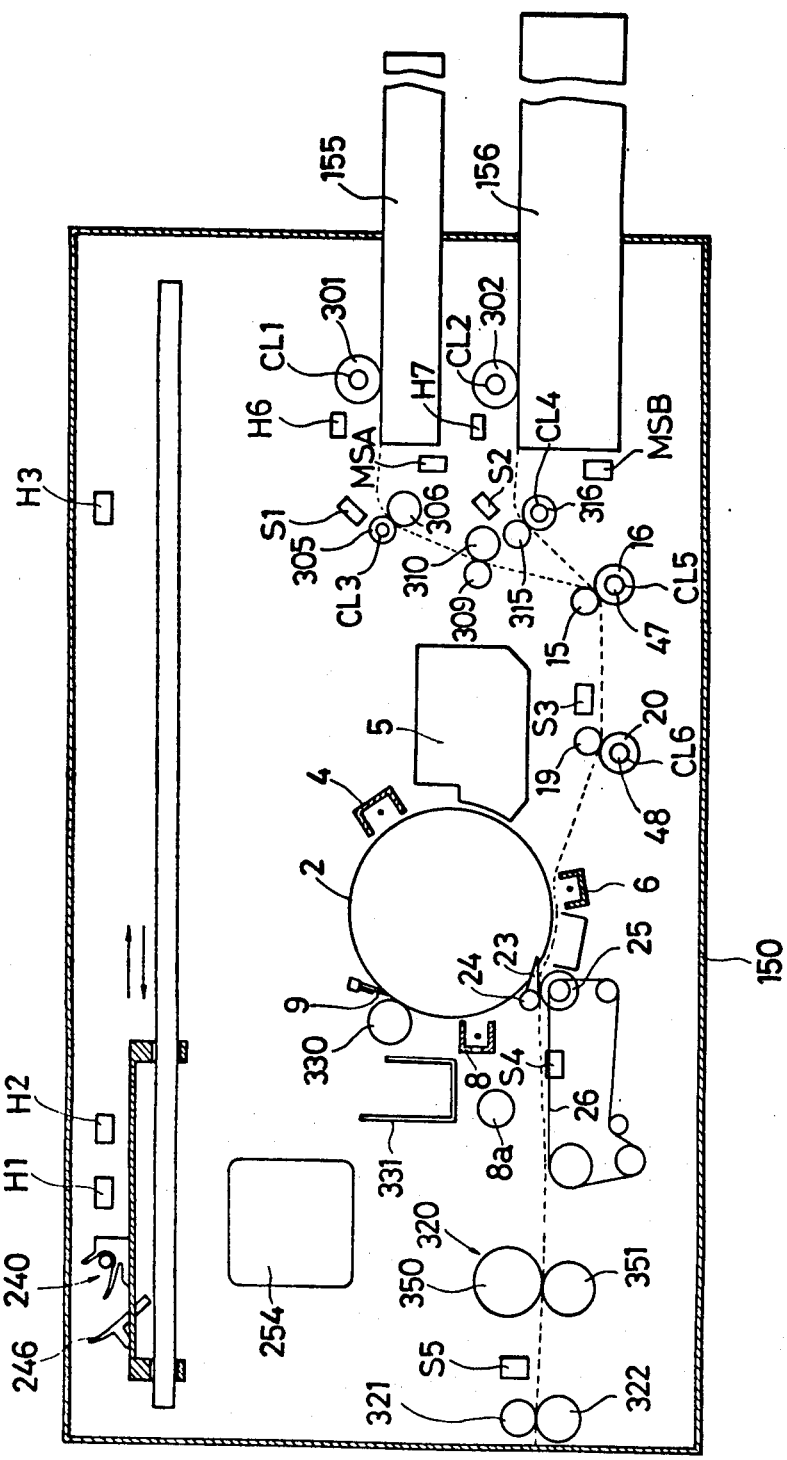
FIG. 5 is a longitudinal sectional view of the copy sheet transport path.

Referring again to FIG. 3 and furthermore to FIG. 5, the upper and lower cassettes 155 and 156 are detachably supported in the apparatus housing 150, and feeding rollers 301 and 302 are respectively disposed so as to contact with a top sheet of the copy sheets stored in cassettes 155 and 156. When the upper cassette 155 supplies a copy sheet, a copy sheet carried by the feeding roller 301 is transported between guide plates 303 and 304, transport rollers 305 and 306, guide plates 307 and 308, transport rollers 309 and 310, guide plates 311 and 312 to transport rollers 15 and 16. In the lower cassette 156, a copy sheet carried by the feeding roller 302 is transported through guide plates 313 and 314, transport rollers 315 and 316, guide plates 318 and 319 to transport rollers 15 and 16. In this way, although copy sheets stored in the two cassettes 155 or 156 are forwarded along different transport paths until the position of the transport rollers 15 and 16, thereafter the copy sheets are carried along a common transport path therefrom.

The copy sheet carried by the transport rollers 15 and 16 is transported through guide plates 17 and 18 and carrying rollers 19, 20 to guide plates 21, 22, and advanced so as to come into contact with the photosensitive surface of the drum 2 at a position facing the transfer corona charger 6. After completion of transferring, the edge of the copy sheet is peeled off from the surface of the drum 2 by means of a peeling click 23, is nipped by peeling rollers 24, 25 and is transported to a fixing device 320 by an endless carriage belt 26. After fixing device 320 fixes a toner image onto the copy sheet, discharge rollers 321 and 322 discharge the reproduced copy sheet to the copy collection tray 160.

DRIVING MEANS

Figure 6:
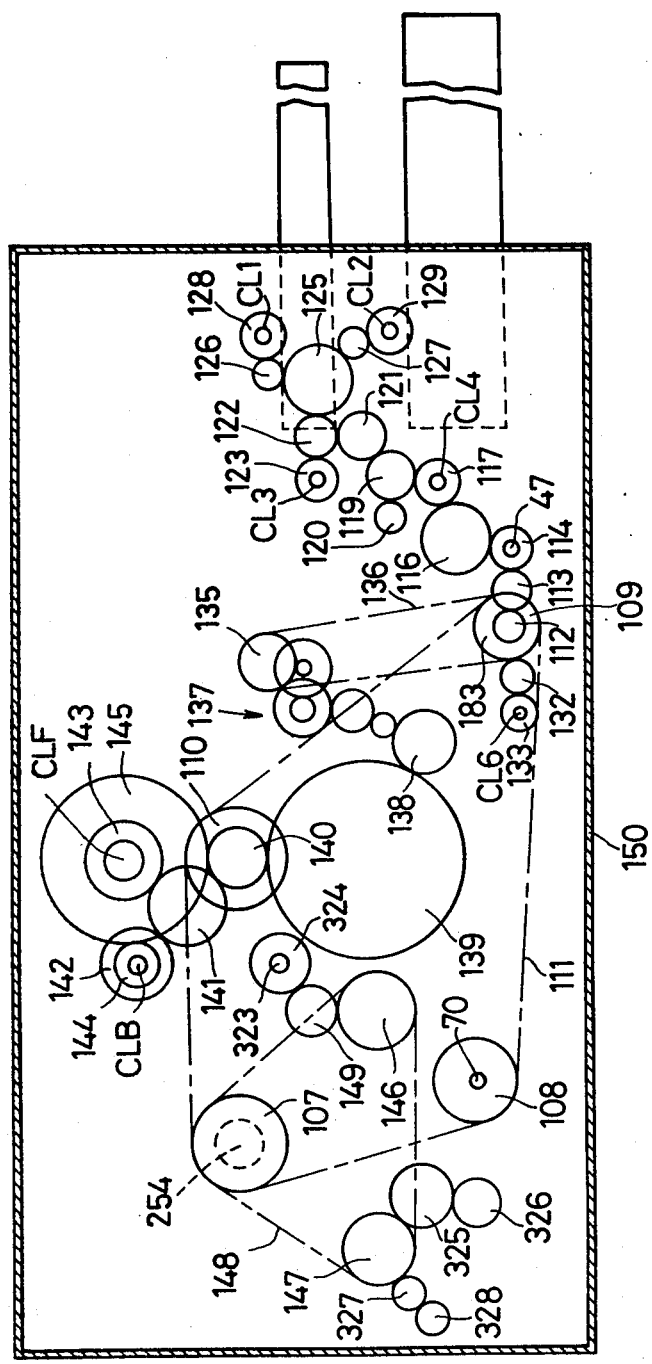
FIG. 6 is a schematic longitudinal sectional view depicting the driving means.

FIG. 6 is a schematic longitudinal sectional view depicting the driving means. An endless chain 111 passes over a sprocket wheel 107 fixed to the output shaft of the motor 254, a sprocket wheel 108 fixed to a driving shaft 70 of a driving roller 65 (refer to FIG. 3) and then over sprocket wheels 109 and 110. A gear 112 is coaxially fixed to the sprocket wheel 109 and meshes with a gear 114 via a gear 113. This gear 114 is connected to a shaft 47 (refer to FIG. 5) of the transport roller 16 via a clutch CL5. The gear 114 is connected to a gear 117 via a gear 116, and the gear 117 is connected to a shaft of the transport roller 316 via a clutch CL4. The gear 117 is connected to a gear 120 fixed to a shaft of transport roller 310 via a gear 119. The gear 119 is connected to a gear 123 via gears 121 and 122. Gear 123 is connected to a shaft of transport roller 305 via a clutch CL3. The gear 122 is connected to a gear 128 via gears 125 and 126 and to a gear 129 via gears 125 and 127, respectively. Gears 128 and 129 are respectively connected to a shaft of the feeding roller 301 via a clutch CL1 and to a shaft of the feeding roller 302 via a clutch CL2. A gear 183 is connected to a gear 133 via a gear 132, connected to a shaft 48 (refer to FIG. 5) of the carrying roller 20 via a clutch CL6.

A sprocket wheel (not shown) is coaxially provided with sprocket wheel 109. An endless chain 136 passes around this sprocket wheel (not shown) and a sprocket wheel 135. A gear (not shown) coaxial with the sprocket wheel 135, is connected to a gear 138 fixed to a shaft of a developing roller in the magnetic brush developing device 5 via a gear train 137 (partly omitted in FIG. 6).

A gear 140 coaxial with a sprocket wheel 110, meshes with a gear 139 which is coaxially fixed to a rotary shaft of the photosensitive drum 2. The gear 140 is connected to gears 142 and 143 via a gear 141. The gear 142 is connected to a coaxial gear 144 via a backward clutch CLB. Gear 143 is connected to the aforementioned rotary shaft 291 (refer to FIG. 4) via a forward clutch CLF. The rotary shaft 291 is coaxially fitted to a gear 145 which meshes with the gear 144. The clutches CLF and CLB enable an exchange of the direction of travel of the optical device (refer to FIG. 4) between forward and backward directions. When the clutch CLB is opened, driving force from the gear 141 is transmitted to the rotary shaft 291 via the clutch CLF and the pulley 290 rotates in the direction of arrow 293 (refer to FIG. 4). On the other hand, when the clutch CLF is opened, driving force from the gear 141 is transmitted to the rotary shaft 291 via the gear 142, the clutch CLB, the gears 144 and 145. The pulley 290 rotates simultaneously in the direction of arrow 294 (refer to FIG. 4).

An endless chain 148 passes over a sprocket wheel (not shown), which is coaxial with the sprocket wheel 107, and then over sprocket wheels 146 and 147. A gear coaxial with the sprocket wheel 146 is connected to a gear 324 via a gear 149. The gear 324 is fixed to a driving shaft 323 of the magnetic brush cleaning device 13. A gear coaxial with the sprocket wheel 147 is connected to a gear 326 fixed to the shaft of pressure roller 351 via a gear 325, and is connected to a gear 328 fixed to the shaft of the discharge roller 321 via a gear 327.

OPERATION TIMING OF THE DRIVING MEANS

A detecting switch S1 is provided between the feeding roller 301 and roller 305, and a detecting switch S2 between the feeding roller 302 and roller 315. A detecting switch S3 is provided between rollers 15 and 19. A detecting switch S4 is provided downstream in the copy sheet transport direction adjacent to the peeling click 23. A detecting switch S5 is provided between heat roller 350 and the discharge roller 321. The detecting switches S1 and S2 detect a copy sheet bending upward while the feeding rollers 301 and 302 are rotating and the respective pairs of the transport rollers 305, 306 and 315, 316 terminate rotating. The detecting switches S1 to S5 detect a copy sheet being forwarded. Cassette detecting switches MSA and MSB detect respectively the cassettes 155 and 156 which are installed into the apparatus housing 150. The cassettes 155 and 156 are of sizes corresponding to each size of copy sheets stored therein. The cassette detecting switches MSA and MSB recognize which size of copy sheets are stacked in the cassette 155 or 156 and cause the display lamp 162 or 163 to be turned on (refer to FIG. 2). Detecting switches H6 and H7 detect whether the cassette 155 or 156 is filled with the copy sheets, and when they detect that all the copy sheets therein have been used, the display lamp 164 turns on. Detecting switches H1, H2 and H3 detect a moving position of the projector 240. The detecting switch H1 corresponds to a home or initial position of the projector 240, the detecting switch H2 to an exposure commencing position, and the detecting switch H3 to a maximum moving position furthest from the home position of the projector 240.

Figure 7:
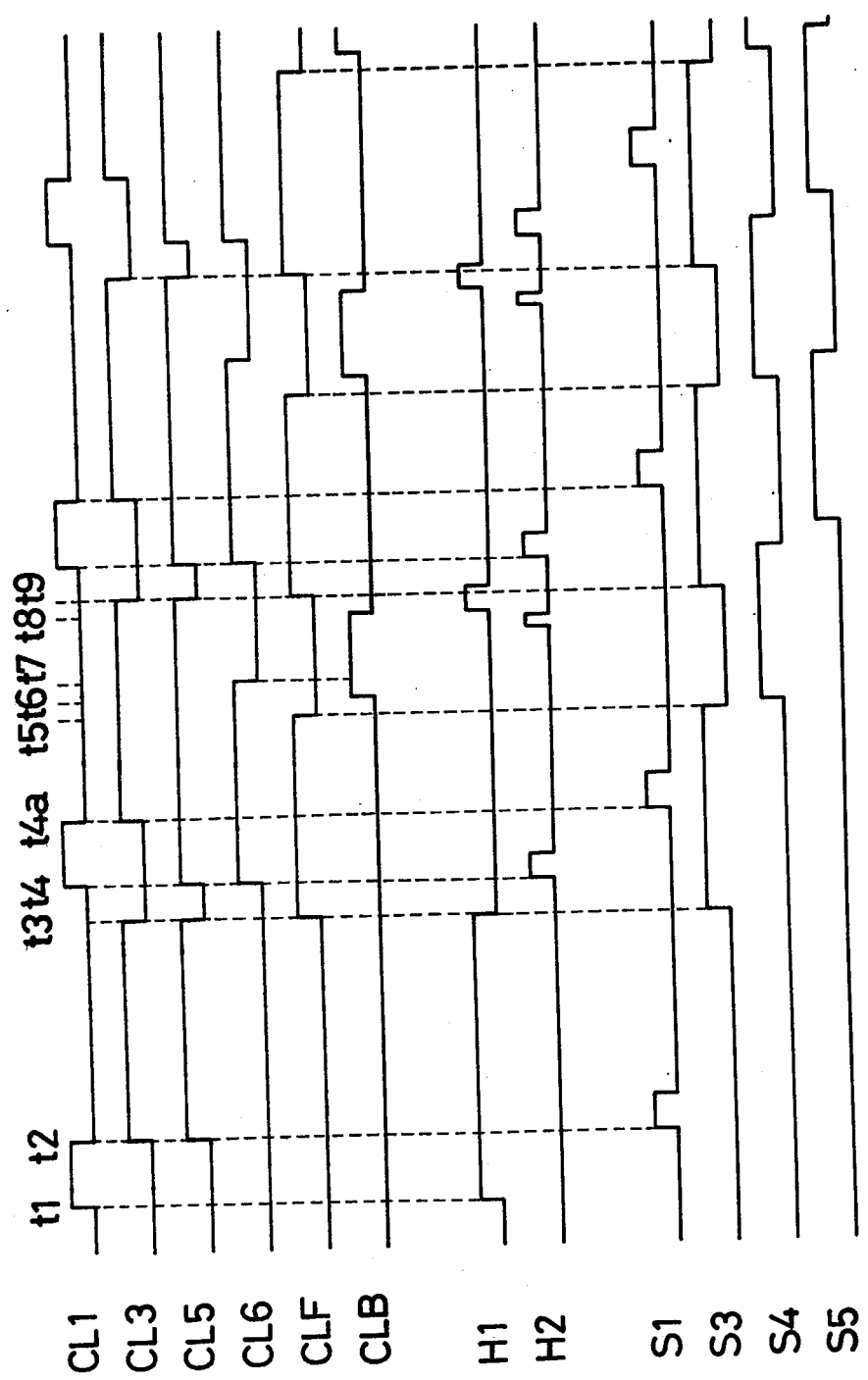
FIG. 7 is performance wave-form when a copying operation is accomplished onto a copy sheet of A4 size stored in an upper cassette.

FIG. 7 depicts performance wave-forms when a copying operation is accomplished onto a copy sheet of A4 size stored in the upper cassette 155 which is attached to the apparatus housing 150. The closed or on states of clutches CL1, CL3, CL5, CL6, CLF and CLB correspond to high level illustrations, and the opened or off states correspond to low level illustrations. The detecting states of detecting switches H1, H2, S1, S3, S4 and S5 correspond to high level illustrations, and non-detecting states correspond to low level illustrations. Control timing of the copying operation is accomplished by the construction mentioned hereinafter with reference to FIG. 33 and FIG. 34.

When a copying operation is commenced, the projector 240 is at the home position and the detecting switch H1 is high level. A single copy is accomplished when exposure lamp 242 turns on at time t1, the clutch CL1 is closed, then the feeding roller 301 begins to rotate, and the copy sheet of A4 size is supplied from the upper cassette 155. The detecting switch S1 detects the copy sheet at time t2, and then the clutches CL3 and CL5 are closed, and the transport rollers 305, 306 and 15, 16 begin to rotate. When the detecting switch S3 detects the copy sheet at time t3, the clutch CL5 is opened and the transport rollers 15 and 16 stop rotating. Then the clutch CLF is closed and the projector 240 begins to move in the exposure direction. When the detecting switch H2 detects the projector 240 at time t4, the clutch CL5 is again closed. The clutch CL6 is also closed and the carrying rollers 19 and 20 begin to rotate. The projector 240 moves through a distance for exposure corresponding to the sheet size and such movement terminates at time t5. Then the clutch CLB is closed at time t6 and the projector 240 returns back to the home position. The clutch CL6 is opened at time t7. The detecting switch H1 detects the projector 240 reaching the home position at time t8. Accordingly a single copy is reproduced.

When operation of multiple copies is commenced, the clutch CL1 is closed at time t4, the feeding roller 301 begins to rotate and then a second paper sheet is supplied. The detecting switch S1 detects the second sheet at time t4a, and the clutch CL3 is closed for copying the second sheet after the detecting switch S3 detects the copy sheet at time t9. The clutch CLF is closed for copying the second sheet, and the projector 240 moves. Further operation is the same as the single copy operation.

Jam detecting switches S1, S3, S4 and S5 are high level as shown by the timing pulses of FIG. 7 when a copying operation is normally accomplished, i.e. when jamming has not occurred. When any of the jam detecting switches S1, S3, S4 and S5 detects a copy sheet, except the timing pulses shown in FIG. 7 and becomes high level, this state means that jamming has occurred. Then the projector 240 and the copy sheet stop moving and the exposure lamp 242 turns off.

Figure 8:
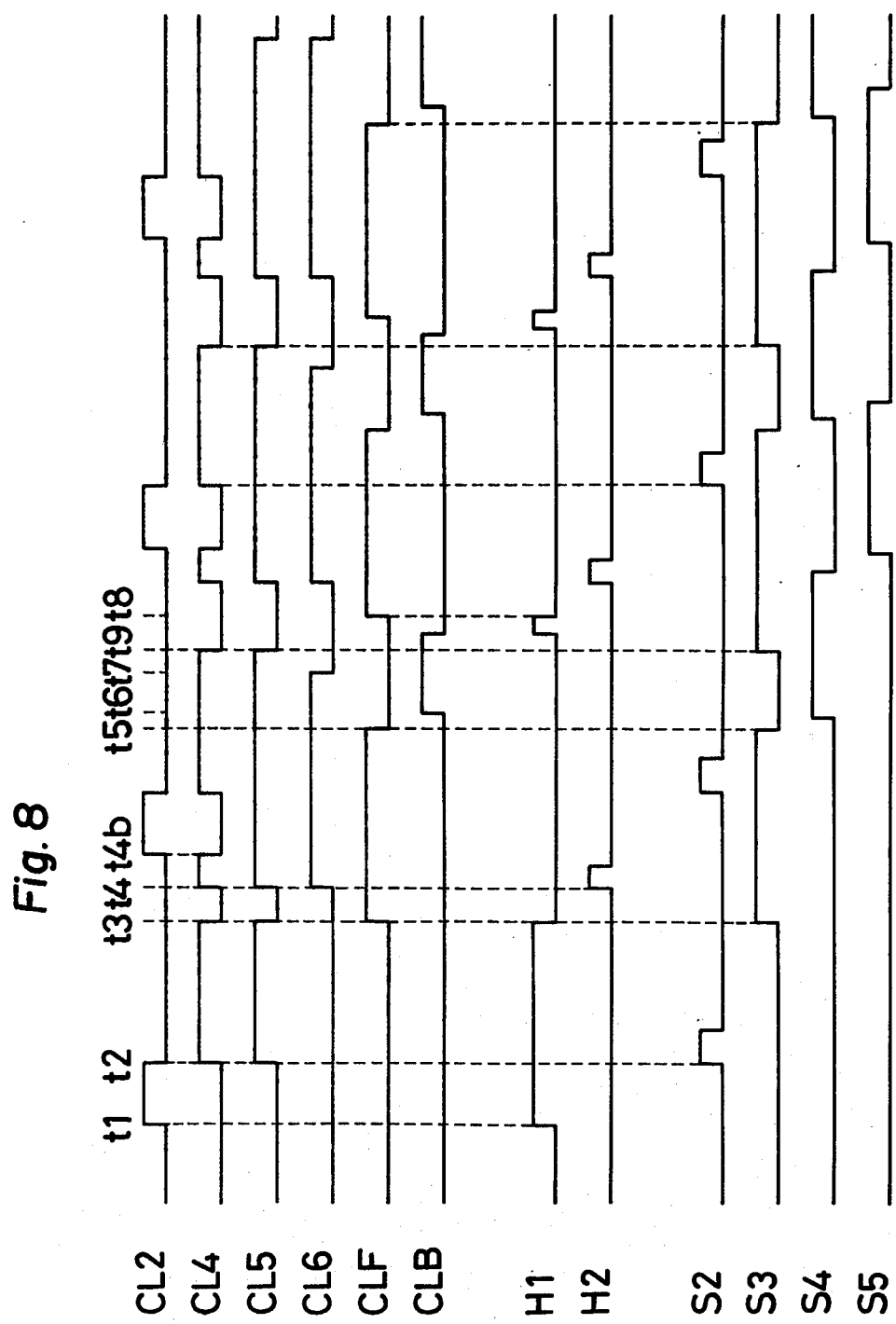
FIG. 8 is performance wave-form when a copying operation is accomplished onto a copy sheet of A4 size stored in a bottom cassette.

FIG. 8 depicts performance wave-forms when a copying operation is accomplished on a copy sheet of A4 size stored in the bottom cassette 156 attached to the apparatus housing 150. In this case, the clutches CL1 and CL3 shown in FIG. 7 correspond to clutches CL2 and CL4 respectively, and the jam detecting switch S1 corresponds to jam detecting switch S2. Times t1 to t7 shown in FIG. 8 correspond to these times in FIG. 7 and the same operations are accomplished. Since the distance of the copy sheet transport path from the feeding roller 302 to the transport rollers 15, 16 is shorter than that of the copy sheet transport path from the feeding roller 301 to the transport rollers 15 and 16, the clutch CL4 corresponding to the clutch CL3 is closed for a period from time t4 to t4b. The copy sheet is substantially transported when the clutch CL4 is closed for this period from t4 to t4b and the transport rollers 315 and 316 rotate. Correspondingly, the order of operation of time t8 and t9 in FIG. 7 is reversed in FIG. 8.

According to this embodiment, the moving distance of the projector 240 for exposure, i.e. a period that the clutch CLF is maintained closed, corresponds to the sheet size stored in the cassettes 155 or 156. Therefore, exposure times corresponding to different paper sizes are different. In other words, the projector 240 does not reciprocate from the home position to the maximum moving position during every copying operation. Therefore, the time required for copying is shortened.

When multiple copies are continually made, the distance from the trailing edge to the leading edge of a subsequent copy sheet along the transport direction becomes short because a subsequent sheet is supplied at time t4 in FIG. 7 or at time t4b in FIG. 8. Accordingly, the time required for copying is shortened.

RELEASE MECHANISM OF PAPER JAMMING

Figure 9:
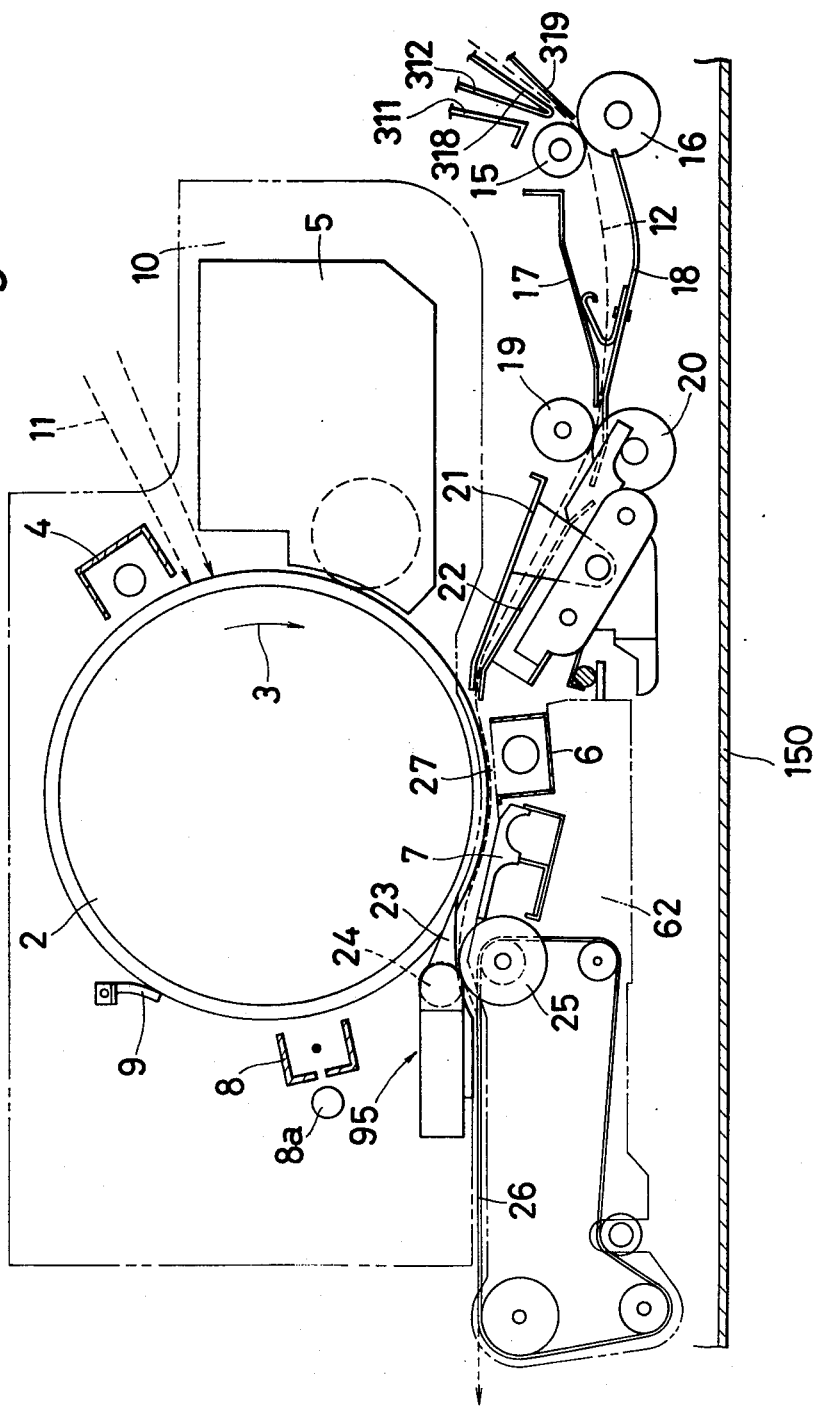
FIG. 9 is an enlarged sectional view in the vicinity of a photosensitive drum.
Figure 10:
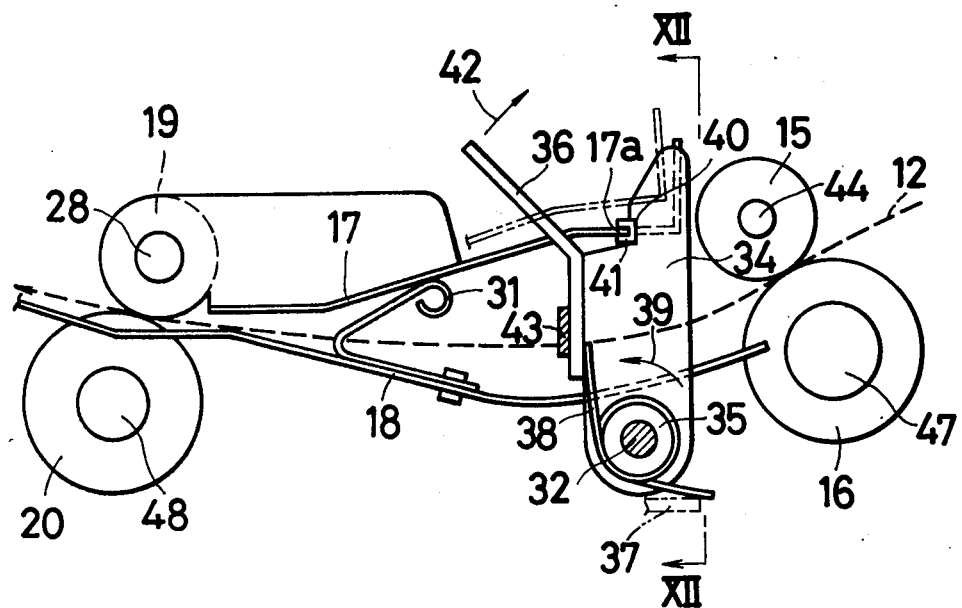
FIG. 10 is a simplified front view in the vicinity of top and bottom guide plates.
Figure 11:
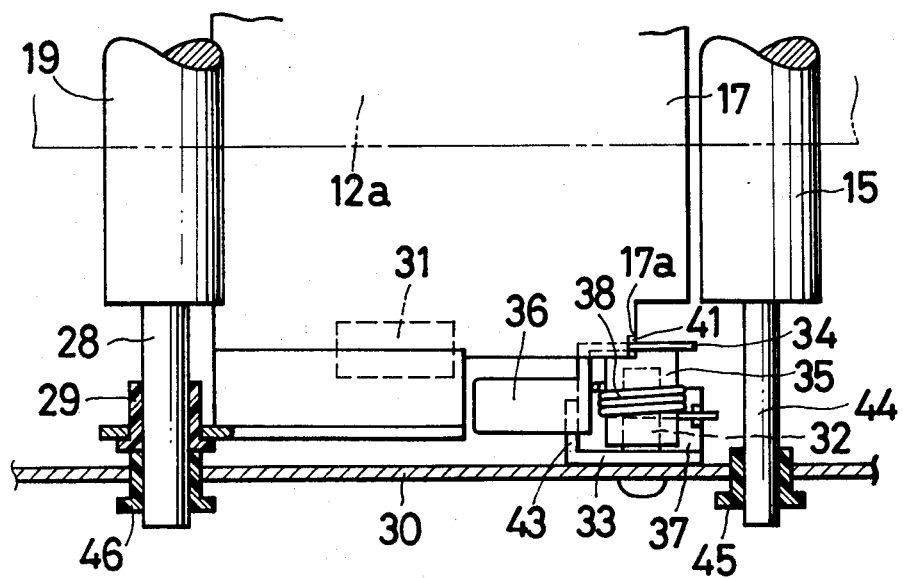
FIG. 11 is a plan view of the top and bottom guide plates shown in FIG. 10.
Figure 12:
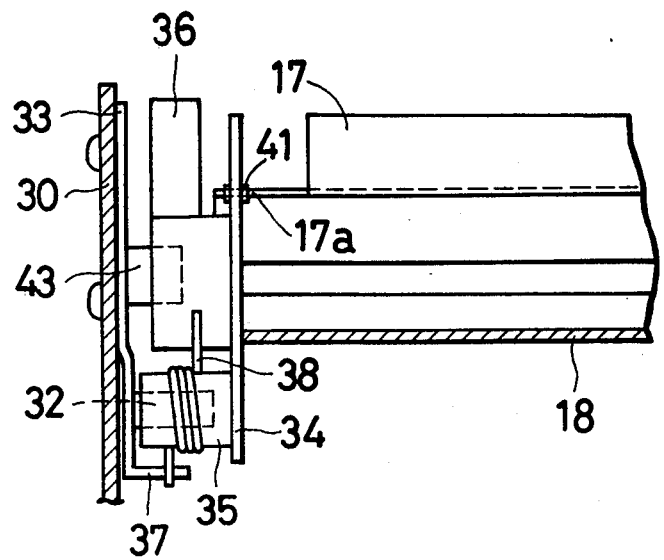
FIG. 12 is a schematic longitudinal sectional view taken along the line XII—XII of FIG. 10.
Figure 13:
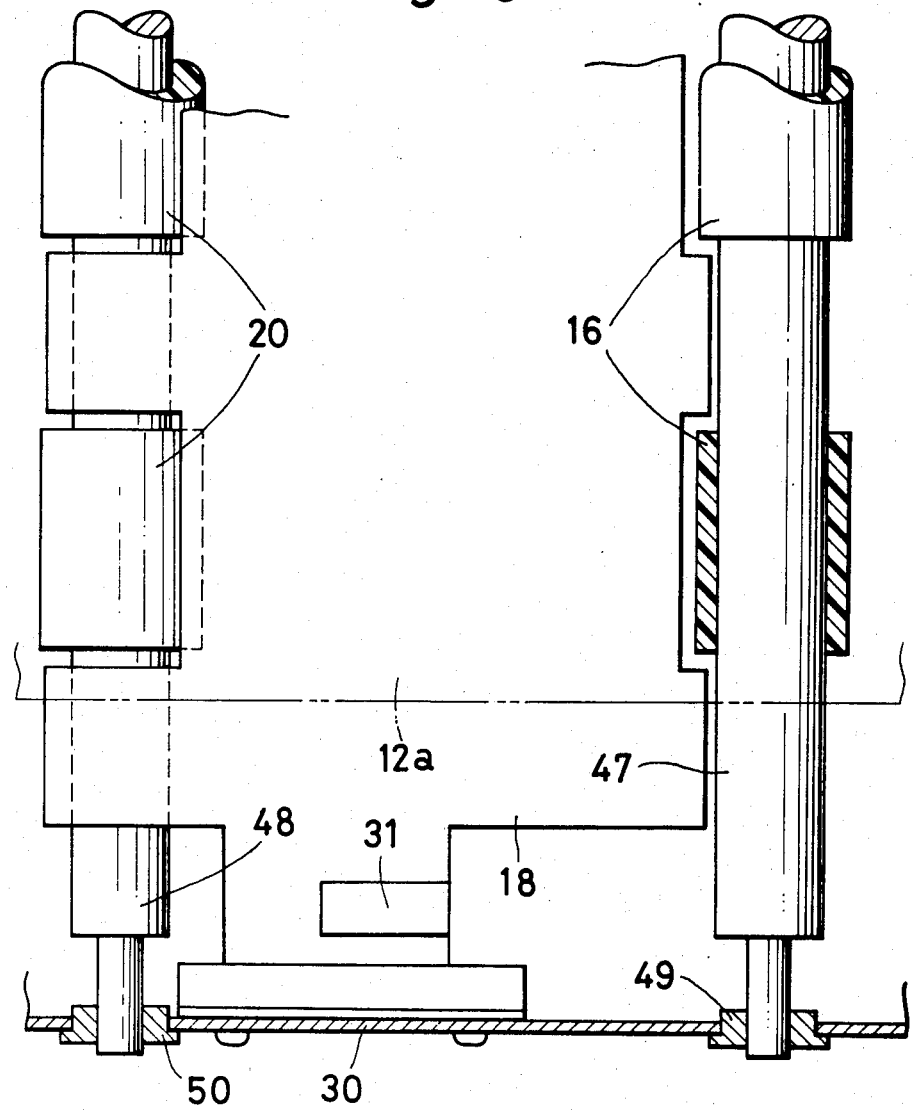
FIG. 13 is a plan view of the bottom guide plate.

FIG. 9 is an enlarged sectional view in the vicinity of the photosensitive drum 2, FIG. 10 is a simplified front view in the vicinity of the top and bottom guide plates 17 and 18, FIG. 11 is a plan view of FIG. 10, FIG. 12 is a schematic longitudinal sectional view taken along the line XII—XII of FIG. 10, and FIG. 13 is a plan view of the bottom guide plate 18. The top guide plate 17 made of metal material is provided downstream of the copy sheet transport path (the left side in FIG. 10) and is supported by a rotary shaft 28 of the carrying roller 19 via a bearing 29 made of synthetic resin material. The bottom guide plate 18 made of electric insulating material is fixed to the front wall 30 and the back wall (not shown) of the apparatus housing 150. A plate spring 31 is provided between the plates 17 and 18. At the upstream side of the copy sheet transport direction (the right side of FIG. 10), the end of the top plate 17 is elastically biased so as to be separated from the bottom plate 18.

A supporting member 33 made of metal and having a horizontal pin 32 is fixed to the front wall 30. An engaging member 34 made of metal for fixing the top plate 17 is supported by the supporting member 33 so as to be biased by the plate spring 31. A boss member 35 of the engaging member 34 is loosely inserted over the pin 32. At the downstream side of the copy sheet transport direction, a lever 36 is disposed. The supporting member 33 has a claw 37 at its lower end. There is provided a torsion spring 38 which surrounds the boss member 35. One end of the torsion spring 38 abuts against the lever 36, and the other end abuts against the claw 37. The engaging member 34 is biased around the pin 32 by the torsion spring 38 in the direction of arrow 39 (refer to FIG. 10). The engaging member 34 has a notch 40 upstream in the copy sheet transport direction. A bushing 41 made of synthetic resin is fixed to the notch 40. The end 17a of the top guide plate 17 is engaged with the notch 40 of the engaging member 34 via the bushing 41. Therefore the top guide plate 17 is supported at a predetermined distance from the bottom guide plate 18 against the force of the plate spring 31.

The lever 36 of the engaging member 34 is swung in the direction of arrow 42 (refer to FIG. 10) against the force of the torsion spring 38. Then the end 17a of the top guide plate 17 is disengaged from the bushing 41, and the top guide plate 17 is raised upwardly by means of the plate spring 31 as depicted by the dots-and-dash lines in FIG. 10. When a copy sheet is jammed between the plates 17 and 18, it is easily removed therefrom. The supporting member 33 is provided with a hindering portion 43 which abuts against the engaging member 34 upstream in the copy sheet transport direction and prevents the top guide plate 17 from excessive movement so that the top guide plate 17 is not bent by the torsion spring 38.

The transport roller 15 and the carrying roller 19 are made of metal material and have rotary shafts 44 and 28 supported to the front wall 30 and the back wall 30 via bearings 45 and 46 made of synthetic resin material. The transport roller 16 and the carrying roller 20 made of synthetic resin material are mounted in parallel and have rotary shafts 47 and 48 made of metal material. The rotary shafts 47 and 48 are supported to the front wall 30 and the back wall via bearings 49 and 50. The rotary shafts 47 and 48 are driven to rotate by means of the driving means (not shown). The transport roller 15 and the carrying roller 19 cooperate with the transport roller 16 and the carrying roller 20. The bearings 45 and 46 of the rotary shafts 44 and 28 are loosely inserted into elongated holes (not shown) in the front wall 30 and the back wall, and are elastically biased toward the bearings 49 and 50 by a spring (not shown). Therefore the transport roller 15 and the carrying roller 19 are in contact with the transport roller 16 and the carrying roller 20, and cooperate therewith.

In this way, the transport rollers 15 and 16 which are in contact with a copy sheet 12a indicated by the dots-and-dash lines in FIG. 11 and FIG. 13, the carrying rollers 19, 20 and the top and bottom guide plates 17, 18 are electrically insulated with respect to the apparatus housing 150. The top and bottom guide plates 17, 18 easily may be released so that a jammed paper may be removed easily.

Figure 14:
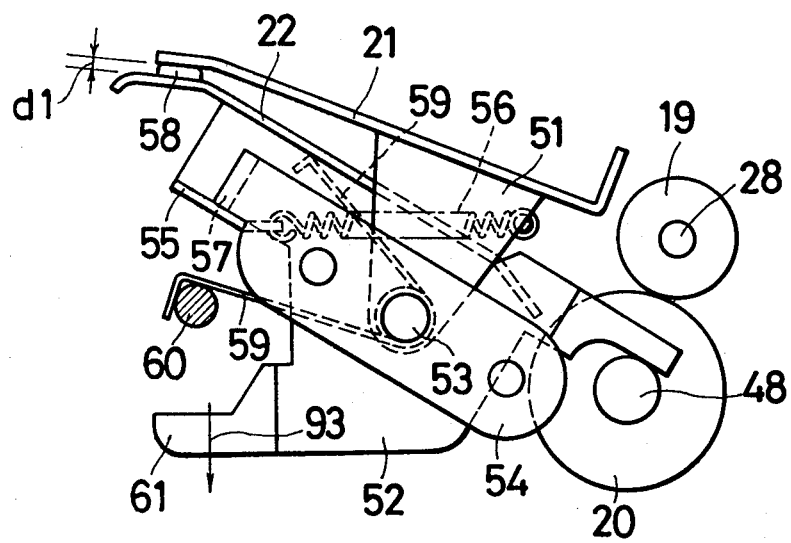
FIG. 14 is a front view in the vicinity of top and bottom guide plates.
Figure 15:
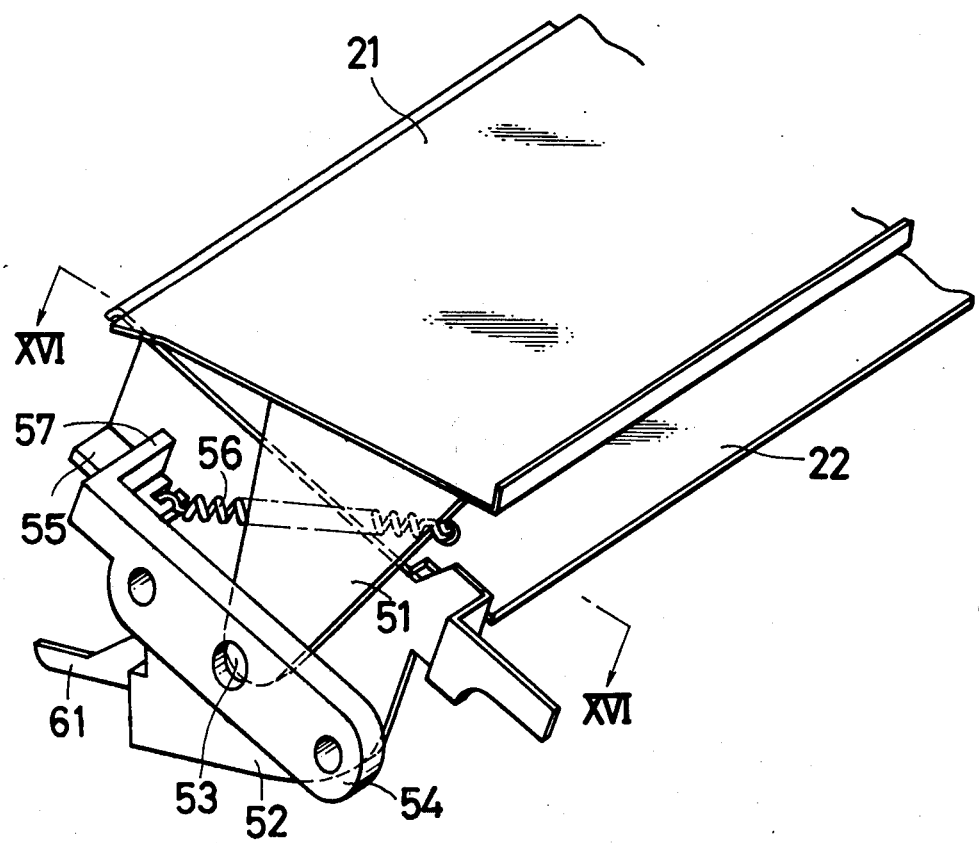
FIG. 15 is a perspective view of the top and bottom guide plates shown in FIG. 14.
Figure 16:
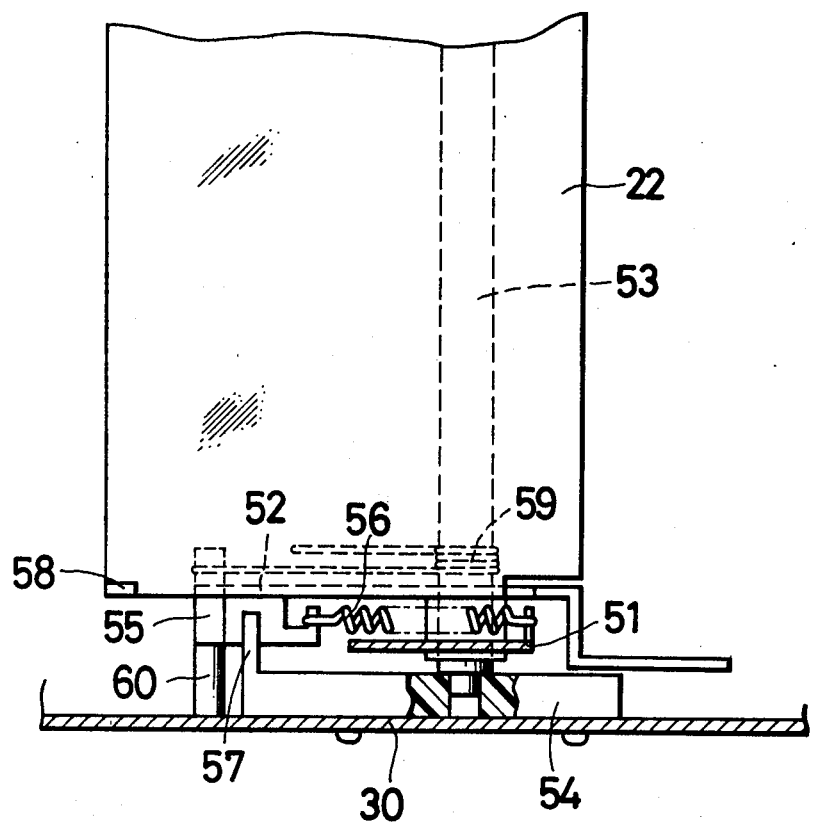
FIG. 16 is a longitudinal sectional view taken along the line XVI—XVI of FIG. 15.

FIG. 14 is a front view in the vicinity of the top and bottom guide plates 21 and 22. FIG. 15 is a perspective view of FIG. 14. FIG. 16 is a longitudinal sectional view taken along the line XVI—XVI of FIG. 15. The top guide plate 21 and the bottom guide plate 22 are formed of metal material. Supporting members 51 and 52, extending downwardly, are respectively fixed to the ends of the top and bottom guide plates 21 and 22 along the copy sheet transport direction. There is provided the shaft 53 which extends in the forward and backward direction of the apparatus housing 150 (in the longitudinal direction in FIG. 16) and is loosely inserted through the supporting members 51 and 52. Each end of the shaft 53 is supported by a receiving member 54 made of synthetic resin fixed to the front wall 30 or the back wall. The width of the top guide plate 21 is greater than that of the bottom guide plate 22 so that the transversely disposed ends of the top guide plate 21 are engaged with engaging members 57 of the receiving member 54 downstream in the copy sheet transport direction when the top guide plate 21 swings around the shaft 53.

At the downstream side in the transport direction of the supporting member 52, there is provided an outwardly projecting receiving click or cog 55. One end of a spring 56 is connected to the receiving click 55, and the other end of the spring 56 is connected to the supporting member 51. The top and bottom guide plates 21 and 22 are biased by the spring 56 so as to be closer to each other downstream in the copy sheet transport direction. One end of the bottom guide plate 22 in the downstream side of the copy sheet transport direction has a longitudinally projecting projection 58, and the distance "d1" (refer to FIG. 14) is spaced to advance a copy sheet when the under side of the top guide plate 21 abuts against the projection 58. There is provided a torsion spring 59 which surrounds the shaft 53. One end of the torsion spring 59 contacts with the bottom guide plate 22, and the other end contacts with a horizontal pin 60 projecting from the front wall 30 beneath the bottom guide plate 22. The bottom guide plate 22 is repulsively biased clockwise around the shaft 53 as viewed in FIG. 14. Engaging member 57 of the receiving member 54 engages with the receiving click 55 of the supporting member 52 so as to prevent the supporting member 52 from excessive movement. At the lower end of the supporting member 52, a contact portion 61 is formed under the pin 60. A contact portion 63 of a frame 62 (see FIG. 17) contacts with the contact portion 61 and is biased downwardly. The bottom guide plate 22 and the top guide plate 21 are swung around the shaft 53 in the counterclockwise direction of FIG. 14.

Figure 17:
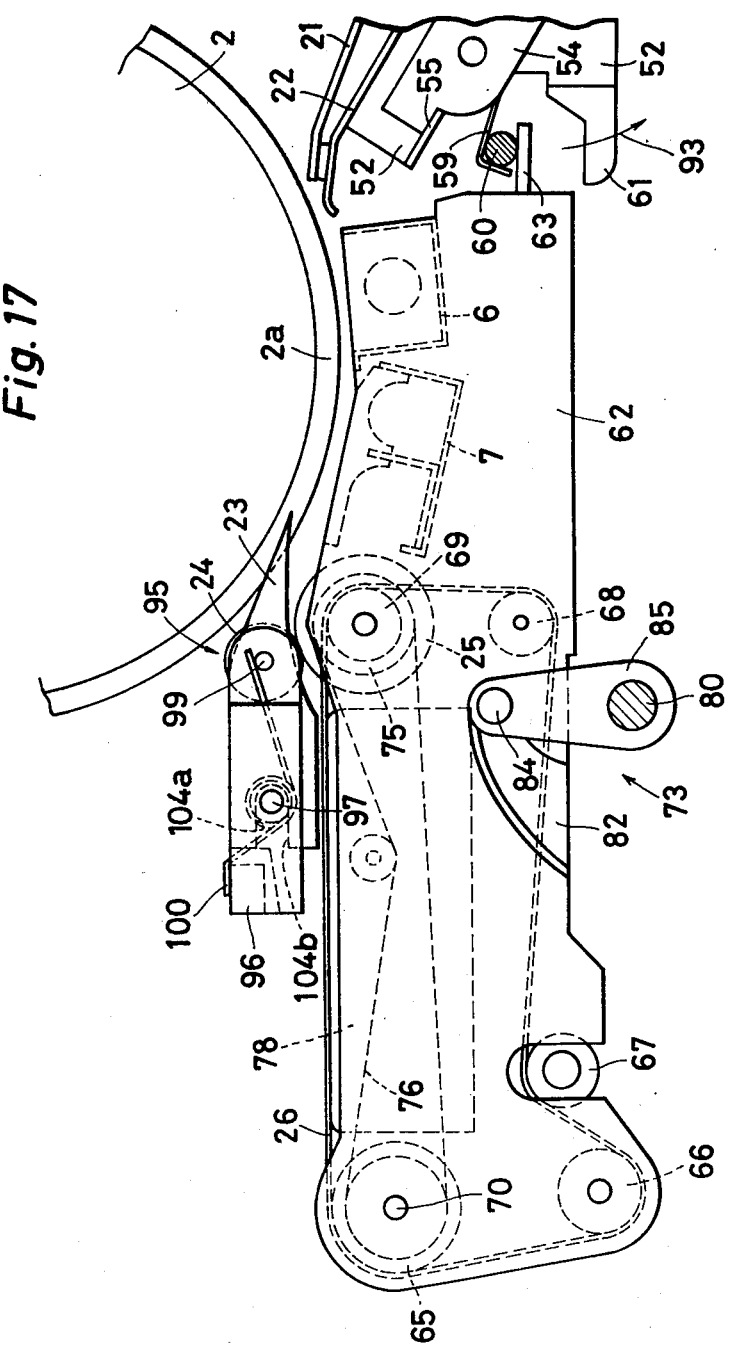
FIG. 17 is a schematic front view in the vicinity of a peeling member and a carriage belt, with a front wall being omitted.
Figure 18:
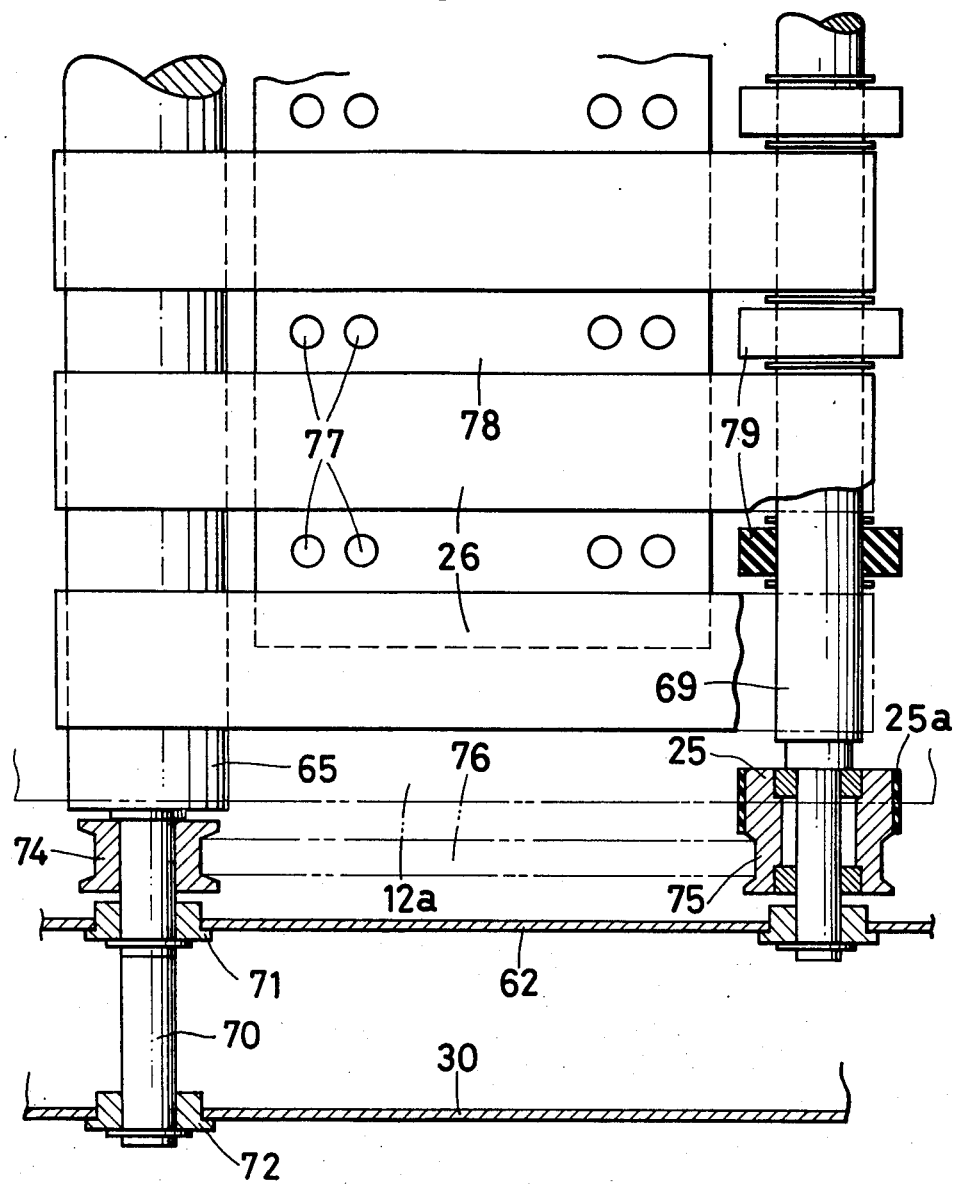
FIG. 18 is a schematic plan view of FIG. 17, with the peeling member being omitted.

FIG. 17 is a schematic front view in the vicinity of the peeling member 95 and a carriage belt 26, with the front wall 30 being omitted. FIG. 18 is a schematic plan view of FIG. 17, with the peeling member 95 being omitted. A plurality of carriage belts 26 made of rubber material are arranged at regular intervals forward and backward of the apparatus housing 150 (in the longitudinal direction of FIG. 18), and are trained around a driving roller 65, a roller 66, a tension roller 67, and rollers 68 and 69. These rollers 65 to 69 are supported on frame 62 provided at the inner side with respect to the front wall 30 and the back wall. A driving shaft 70 of the driving roller 65 penetrates through the frame 62 via a bearing 71, and is supported on the front wall 30 and the back wall via bearings 72. Therefore the frame 62 is supported by the driving shaft 70, and the state of FIG. 17 is maintained by means of a supporting member 73. The transfer corona charger 6 and the corona charger 7 for separation of copy sheets are fixedly mounted on the frame 62. The driving shaft 70 is driven to rotate by the driving means (not shown).

A pulley 74 is fixed to the driving shaft 70, and peeling roller 25, whose surface is coated with rubber 25a, is rotatably disposed on the roller 69. The peeling roller 25 has a pulley portion 75, and a timing belt 76 passes over around the pulley 74 and the pulley portion 75 as shown by the dots-and-dash lines in FIG. 18. The peripheral speed of the peeling rollers 24 and 25 nipping the copy sheet is equal to the transferring speed of the copy sheet, and the speed of the carriage belt 26 is slightly faster than that of the peeling rollers 24 and 25 to prevent the sheet on the transport path from being bent or jammed.

Referring to FIG. 18, there is mounted a suction box 78 having a plurality of holes 77 facing upwardly between carriage belts 26 inside the frame 62, and suction fan (not shown) is detachably connected to the suction box 78. A transferring copy sheet is allowed to adhere closely and fixedly to the carriage belts 26 by suction air through the holes 77 into the suction box 78.

A plurality of separate rollers 79 made of synthetic resin material are coaxially mounted around the roller 69 at intervals in the axial direction.

Since the periphery of the peeling roller 25, the separate rollers 79 and the carriage belts 26 which contact with the copy sheet 12a as shown by the dots-and-dash lines in FIG. 18 are made of electrical insulating material, the copy sheet 12a is electrically insulated from the apparatus housing 150.

Figure 19:
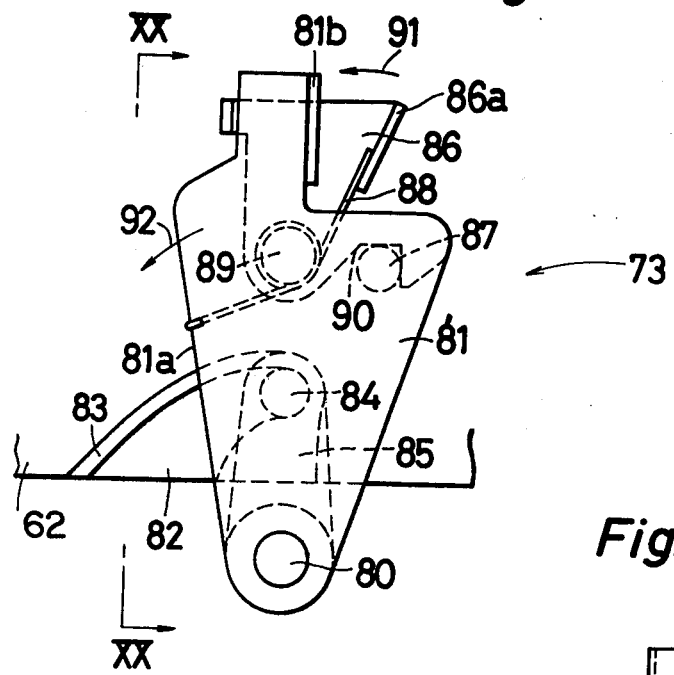
FIG. 19 is a front view of a supporting member, with the front wall being omitted.
Figure 20:
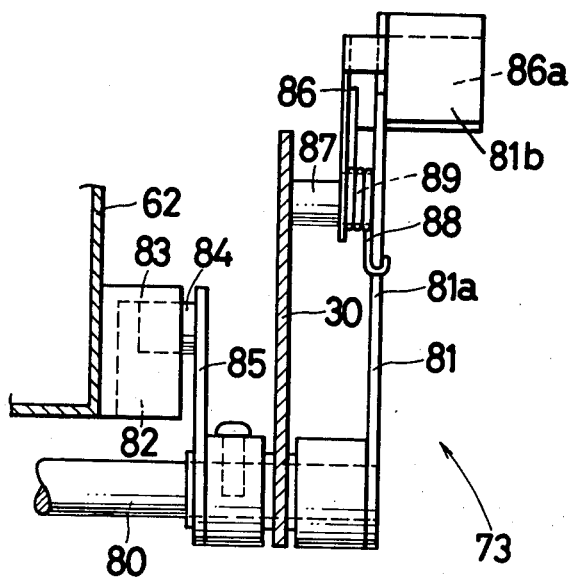
FIG. 20 is a schematic sectional view taken along the line XX—XX of FIG. 19.

FIG. 19 is a front view of the supporting member 73 with the front wall 30 being omitted. FIG. 20 is a schematic sectional view taken along the line XX—XX of FIG. 19. The supporting member 73 comprises a horizontal rotary shaft 80 rotatably penetrated from the front wall 30 to the back wall, a lever 81 fixed to the end of the rotary shaft 80, a guide member 83 made of synthetic resin material having a guide groove 82 which is diagonally curved upstream in the copy sheet transport direction and fixed to the frame 62, an engaging member 85 having a projecting portion 84 engaged with the guide groove 82 and fixed to the rotary shaft 80, a release lever 86 having a horizontal axial line and supported swingably to the lever 81, an engaging member 87 projecting from the front wall 30, and a torsion spring 88 by which the release lever 86 is biased so as to engage with the engaging member 87. The lever 81 is provided with a horizontal shaft 89 to which the release lever 86 is rotatably mounted. The engaging member 87 is arranged an the front wall 30 on the opposite side with respect to the guide member 83. The release lever 86 has an engaging portion 90 so as to engage with the engaging member 87. The torsion spring 88 surrounds the shaft 89, and has one end linked to a knob 81a of the lever 81 at the downstream side of the copy sheet transport direction and another end abutted against a knobbed member 86a on the end of the release lever 86 at the upstream side of the copy sheet transport direction. The release lever 86 is biased clockwise around the shaft 89 so as to engage with the engaging member 87 by the torsion spring 88 as viewed in FIG. 19.

The frame 62 is supported by the driving shaft 70, and is given a torque and inclination to swing around the driving shaft 70 in a clockwise direction by the weight of the frame 62 and its attachments, as viewed in FIG. 17. Therefore the frame 62 is horizontally maintained because the projecting portion 84 of the engaging member 85 is arranged to the top portion of the guide groove 82. In the event of jamming in the copy sheet transport path 12, the release lever 86 is swung around the shaft 89 in the direction of arrow 91 by knobbed member 86a of the release lever 86, to cause the frame 62 to move downwardly. Engaging portion 90 is disengaged from the engaging member 87, against the torque exerted by the torsion spring 88. The lever 81 is swung around the rotary shaft 80 in the direction of arrow 92 when the knobbed member 86a abuts against a knob 81b of the lever 81. Accordingly, the engaging member 85 is moved along the guide groove 82 in the direction of arrow 92 around the rotary shaft 80, and the boss 84 is disengaged from the guide groove 82. Since the support member of the frame 62 is consequently disengaged, the frame 62 is enabled to move downwardly by clockwise movement around the driving shaft 70 as viewed in FIG. 17. Therefore the jammed sheet is easily removed from the copy sheet transport path 12.

The peeling roller 24 installed in the retaining means 10 is in contact with peeling roller 25 on the frame 62 except when the frame 62 is swung downwardly. Even though jamming occurs on the copy sheet transport path 12, the retaining means 10 for supporting the photosensitive drum 2 may not to be drawn out of the apparatus housing 150 except when the frame 62 is swung downwardly and the copy sheet transport path 12 is released. Therefore since the photosensitive drum 2 is drawn out of the apparatus housing 150 in the event of the jamming, the photosensitive drum 2 is prevented from having wound thereon a jammed sheet. The upper end of the frame 62 may be extended to the under side portion of the retaining means 10 so that the retaining means 10 can not be drawn out without downward movement of the frame 62.

At the upstream side of the copy sheet transport direction, the contact member 63 arranged at the end of the frame 62 abuts with the contact portion 61 of the supporting member 52 in response to downward movement of the frame 62, and the contact portion 61 is biased in the direction of arrow 93 (refer to FIG. 17). Referring again to FIG. 14, when the contact member 63 abuts against the contact portion 61, the supporting member 52 and the bottom guide plate 22 are swung counterclockwise around the shaft 53 as viewed in FIG. 14, against the torque of the spring 59. Since the top guide plate 21 is downwardly swung so as to abut against the engaging member 57 of the receiving member 54, excessive movement of the top guide plate 21 is prevented. When the bottom guide plate 22 is swung counterclockwise as viewed in FIG. 14, the space between the top and bottom guide plates 21 and 22 is increased. Accordingly a jammed sheet is easily removed.

Figure 21:
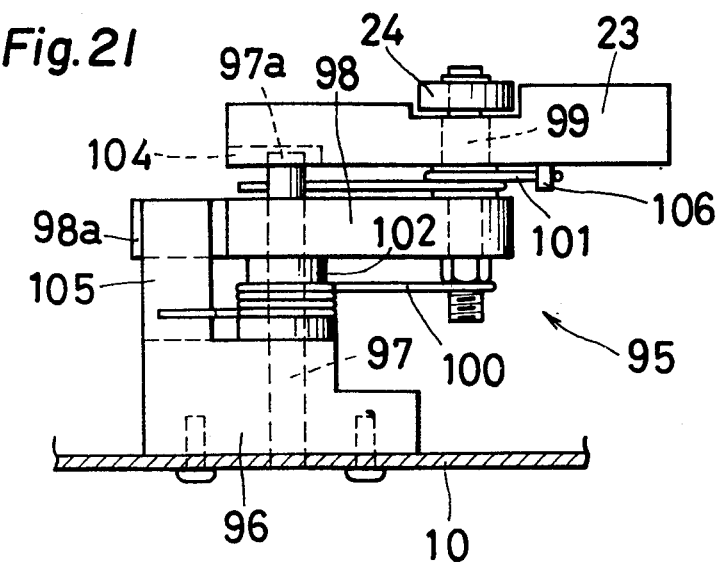
FIG. 21 is a plan view of the peeling member.
Figure 22:
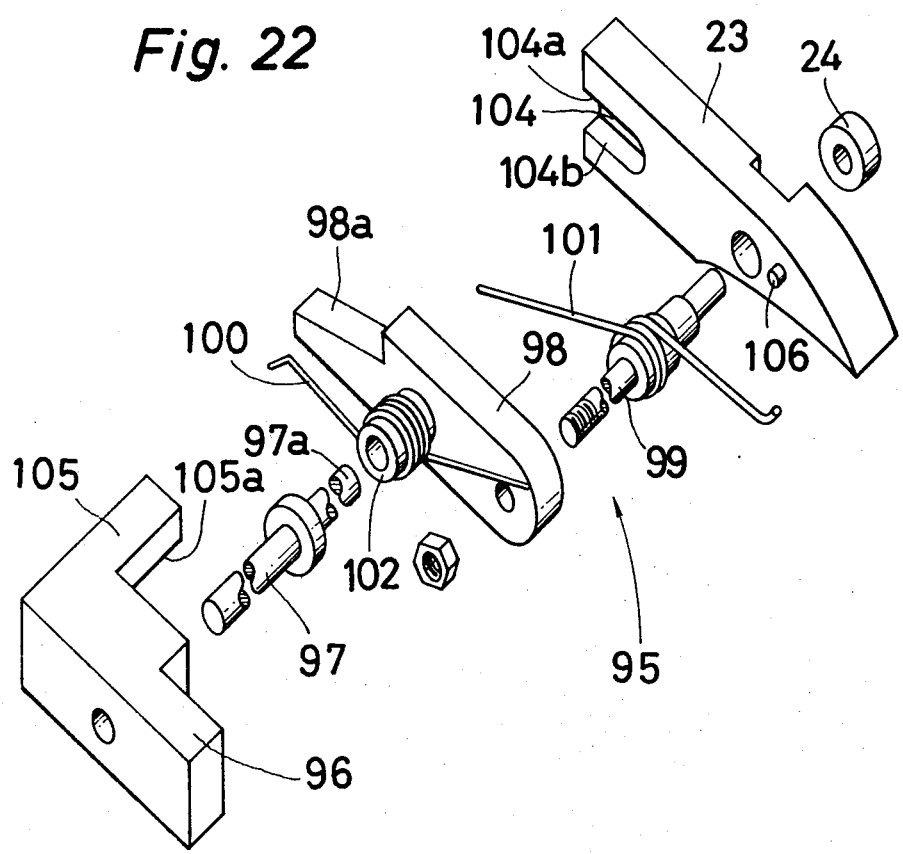
FIG. 22 is a perspective fragmentary view of the peeling member.

FIG. 21 is a plan view of the peeling member 95, and FIG. 22 is a perspective fragmentary view of FIG. 21. The peeling member 95 comprises a fixing member 96 made of synthetic resin fixed to the retaining means 10, a horizontal pin 97 supported rotatably by the fixing member 96, a retaining member 98 supported on the pin 97, a horizontal pin 99 supported rotatably by the retaining member 98, peeling clock or cog 23 supported rotatably on the pin 99, the peeling roller 24 supported rotatably on the pin 99, a torsion spring 100 exerting a torque on the pin 99 around the pin 97 in the clockwise direction as viewed in FIG. 17, and another torsion spring 101 exerting a torque on the peeling click 23 around the pin 99 in the counterclockwise direction as viewed in FIG. 17. Pins 97 and 99 are made of metal material. The fixing member 96, the retaining member 98 and the peeling click 23 are made of synthetic resin material.

The pin 97 penetrates through a boss portion 102 of the retaining member 98, and a free end 97a is engaged with a depression 104 on the end of the peeling click 23 at the downstream side of the copy sheet transport direction. The torsion spring 100 surrounds the boss portion 102. One end of the spring 100 is linked to the top portion of the engaging member 105 of the fixing member 96, and the other to the top portion of the pin 99 penetrating through the supporting member 98. The pin 99 penetrates through the peeling click 23, and the peeling roller 24 is supported on the other end of the pin 99. Therefore the peeling roller 24 is biased against the bottom peeling roller 25 by the torsion spring 100.

The torsion spring 101 surrounds the pin 99, and one end of spring 101 is linked to the bottom portion of the pin 97, and the other end to a projecting portion 106 protruding from the peeling click 23. The peeling click 23 is biased counterclockwise around the pin 99 as viewed in FIG. 17. Depression 104 in the peeling click 23 is engaged with the end 97a of the pin 97, and thus the peeling click 23 is allowed to swing from a position where an upper surface 104a abuts end 97a to a position wherein a lower surface 104b of the depression 104 abuts end 97a.

Assume that a jamming occurs when a copy sheet is nipped between notches 2a arranged at the circumferential ends of the photosensitive drum 2 and the peeling click 23. The frame 62 is released downwardly as noted above, and disengages the peeling roller 24 from peeling roller 25. The peeling click 23 is biased clockwise by the torsion spring 100 as shown in FIG. 22 until the contact portion 98a of the retaining member 98 abuts against the bottom side 105a of the engaging member 105. The peeling click 23 is biased counterclockwise around the pin 99 by the torsion spring 101 until the upper side 104a of the depression 104 abuts against the pin 97. Generally since the distance δ between the surface of the photosensitive drum 2 and the peeling click 23 in association with the notch 2a is extended, see FIG. 23, a jammed sheet is easily removed from the apparatus housing 150.

According to this embodiment of this invention, since members which abut against any sheet partly transported along the transport path in the transferring area are completely insulated from the apparatus housing 150, an electric charge applied to the copy sheet is prevented from escaping through the apparatus housing 150. Therefore, the copy operation is generally accomplished without regard to the electric resistance of the copy sheets.

MAGNETIC BRUSH CLEANING DEVICE 13

Referring again to FIG. 13, the developing material such as one-component magnetic toner remaining on the photosensitive surface of the drum 2 after the transferring step is erased by the erasing corona charger 8 and the charge erasing lamp 8a, and is cleaned by the cleaning device 13. The magnetic brush cleaning device 13 comprises a permanent magnet bar 330 parallel with the photosensitive drum 2 and a sump 331. The outer periphery of the permanent magnet bar 330 circumferentially has a plurality of alternate magnetic poles at predetermined intervals. In this embodiment the magnet bar 330 has eight poles. Residual toner particles remaining on the photosensitive drum 2 are attracted to the permanent magnet bar 330 and drop into the sump 331 through an opening 333 via a responsive plate 332 and are stored therein.

Figure 24:
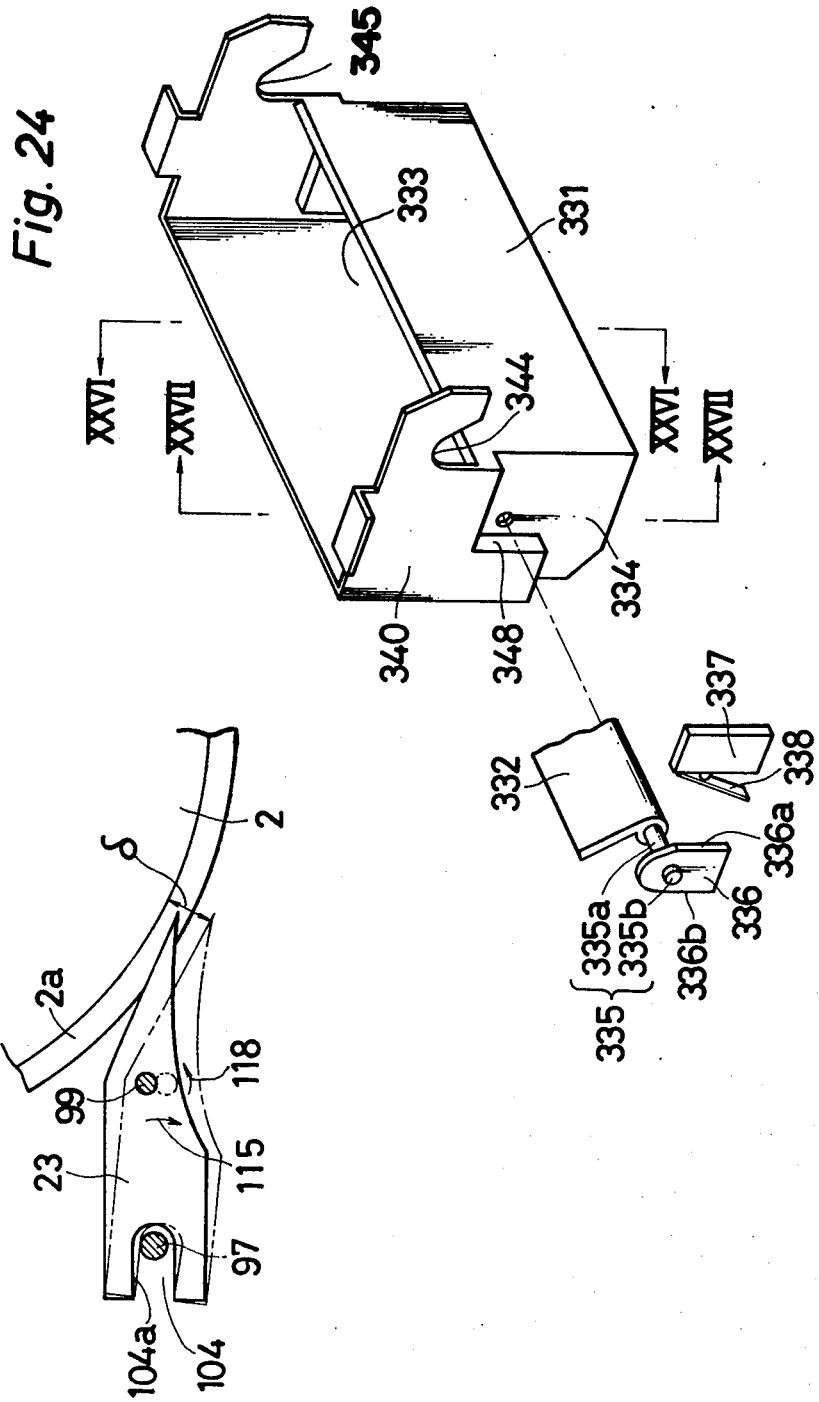
FIG. 24 is a perspective fragmentary view of a sump.
Figure 25:
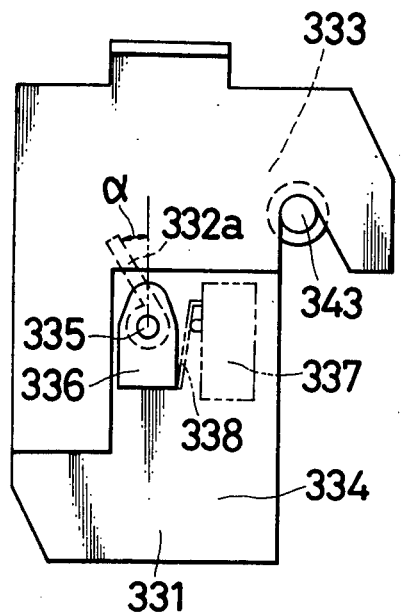
FIG. 25 is a left side view of the sump shown in FIG. 24.
Figure 26:
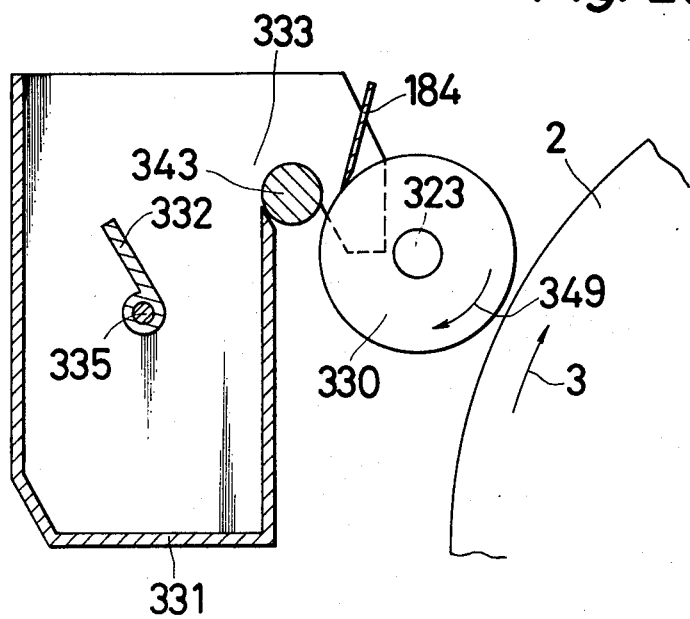
FIG. 26 is a simplified overall view of a cleaning device.
Figure 27:
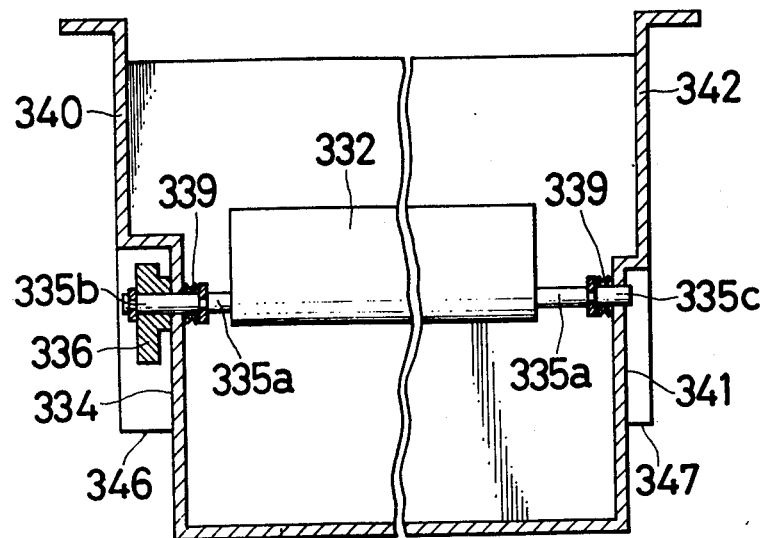
FIG. 27 is a sectional view taken along the line XXVII—XXVII of FIG. 24.

FIG. 24 is a perspective fragmentary view of the sump 331. FIG. 25 is a left side view of FIG. 24. FIG. 26 is a simplified overall view of the cleaning device 13 including a sectional view taken along the line XXVI—XXVI of FIG. 24. FIG. 27 is a sectional view taken along the line XXVII—XXVII of FIG. 24. The sump 331 made of synthetic resin material such as acryl resin is formed by a plastic molding operation. The opening 333 of this sump 331 is elongated along the axial line of the photosensitive drum 2 when it is disposed in the apparatus housing 150. The left end of the sump 331, as shown in FIG. 24, has a recess 334 extending in the axial direction of the sump 331 (toward the right of the FIG. 24) adjacent to the photosensitive drum 2. The sump 331 pivotally supports a shaft 335. The shaft 335 has an axis extending along the opening 333 (i.e. the longitudinal direction of the sump 331). The shaft 335 comprises an elongating portion 335a along the entire longer side of the sump 331 and an end 335b projecting out of the sump 331. The portion 335a of the shaft 335 placed inside of the sump 331 is fixed to the responsive plate 332, made of acryl resin, which extends centrifugally from the shaft 335. This responsive plate 332 extends over the whole length of the opening 333 in the sump 331. The end 335b of the shaft 335 projects outwardly from the sump 331 at a recess 334 of the sump 331. A operating plate 336 is fixed to projecting end 335b. When toner particles are not in contact with the responsive plate 332, the operating plate 336 abuts against an actuator 338 of a micro switch 337, and the angle between the responsive plate 332 and the perpendicular (refer to FIG. 25) is α. This angle α ensures that toner particles on the upper side 332a of the responsive plate 332 facing the opening 333 begin to slide downwardly.

An oil sealing member 339 is disposed at the portion where the shaft 335 penetrates through the sump 331 so as to prevent toner particles from escaping out of the sump 331. The operating plate 336 arranged at the recess 334 does not project beyond the end surface 340 of the sump 331. Therefore the operating plate 336 is prevented from contacting the apparatus housing 150 when the sump 331 is drawn therefrom. The sump 331 has a depression 341 at the other end. The other end 335c of the shaft 335 projects at a recess 341 from the sump 331. The end 335c does not project beyond the end surface 342 of the sump 331 to prevent the end 335c of the shaft 335 from contacting the apparatus housing 150.

A stay 343 as a transport member having a cylindrical form, made of magnetic permeable member such as rigid steel, is fixed to the apparatus housing 150 and is parallel with the axis of the photosensitive drum 2. Engaging members 334 and 345 on the top portion of the sump 331 engages with the stay 343 from the upper side. The protruding surface 346, facing downwardly and formed between the end surface 340 and the racess 334, and another protruding surface 347, facing downwardly and formed between the end surface 342 and the racess 341, are respectively supported on the apparatus housing 150. As noted above, the sump 331 is installed into the apparatus housing 150. A micro switch 337 is fixedly mounted on the apparatus housing 150 so as to be positioned within the above-mentioned recess 334 when the sump 331 is mounted in housing 150. The actuator 338 of the micro switch 337 is opposite to a side portion 336a of the operating member 336 adjacent to the photosensitive drum 2. The protruding surface 348, facing the photosensitive drum 2 and formed between the end surface 340 and the recess 334 prevents the operating member 336 from excessive clockwise movement as shown in FIG. 24 to FIG. 26.

Toner particles drop into the sump 331 through the opening 333. When they are stored at a level higher than the shaft 335, stored toner particles press down upper side 332a of the responsive plate 332. Therefore the shaft 335 is biased counterclockwise as shown in FIG. 24 to FIG. 26. The operating member 336 presses the actuator 338. Then the micro switch 337 is closed, and an alarm indicates that a large quantity of toner particles are stored in the sump 331 by means of turning on a lamp. When the alarm is actuated, the sump 331 is removed, after opening the apparatus housing 150, and toner particles are removed therefrom.

A driving shaft 323 made of stainless steel is fixedly inserted into the permanent magnet bar 330. Therefore the driving shaft 323 is coaxially driven to rotate.

Figure 28:
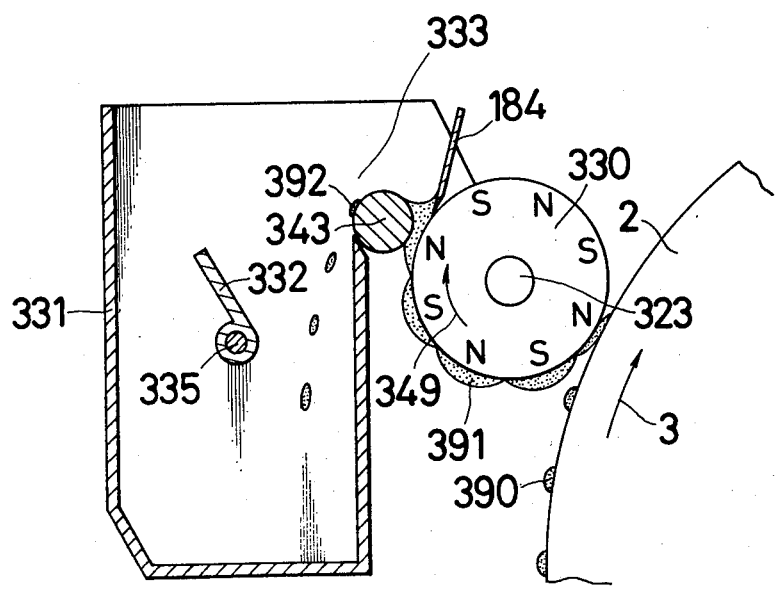
FIG. 28 is a sectional view of the photosensitive drum depicting movement of toner particles from the drum surface to the sump.

FIG. 28 depicts steps during which toner particles are attracted and adhere to the photosensitive drum 2 by means of the permanent magnet bar 330, and then drop into the sump 331 through the opening 333 thereof. The photosensitive drum 2 rotates at a speed of 40 rpm in the direction of arrow 3. On the other hand, the permanent magnet bar 330 is driven to rotate at a speed of 200 to 300 rpm in a direction opposite to the direction of rotation of the photosensitive drum 2, as shown by arrow 349. After completion of a transferring operation, residual toner particles remaining on the surface of the photosensitive drum 2 are illustrated 390. Toner particles 390 adhering to the surface of the permanent magnet bar 330 by means of magnetic force become magnetic brushes 391. The magnetic brushes 391 adhering thereto are advanced to the sump 331 with rotation of the magnetic bar 330 in the direction of arrow 349. Toner particles 391 adhering to the permanent magnet bar 330 are removed therefrom by a blade 184 fixed to the apparatus housing 150 and are attracted to the outer periphery of the stay 343 made of magnetic permeable member. Toner particles 392 adhering to the stay 343 drop into the sump 331 through the opening 333 when the permanent magnet bar 330 rotates in the direction of arrow 349.

An explanation now will be made of the reason why toner particles 392 drop into the sump 331 from the surface of the stay 343. Referring to FIG. 29 (1), a magnetic S-pole 394 is formed on the position of the stay 343 near a magnetic N-pole 393 of the permanent magnet bar 330, and a magnetic N-pole 395 is formed on the opposite side portion of the stay 343. The vicinity of the magnetic N-pole 393 of the permanent manget bar 330 is an area of high magnetic density. The magnetic S-pole 394 of the stay 343 has a smaller magnetic area than that of the magnetic N-pole 395.

When the permanent magnet bar 330 rotates in the direction of arrow 349, the polarity of the stay 343 alternates as shown in FIG. 29 (2). Toner particles 392 adhering to the surface of the stay 343 sequentially advance to the sump 331 with the movement of the polarities 394 and 395 formed on the stay 343.

When the permanent magnet bar 330 further rotates as shown in FIG. 29 (3) and a magnetic S-pole 396 faces the stay 343, the magnetic area of the magnetic N-pole 395 on the stay 343 is smaller than that of the magnetic S-pole 394. At the S-pole 394 having the larger magnetic area, the magnetic attractive force per unit area of the outer periphery of the stay 343 becomes weak.

Therefore, toner particles 392 on the magnetic S-pole are removed from the stay 343 by their own weight and drop into the sump 331. Toner particles 392 have a tendency to be removed from the stay 343 by their inertial force exerted by the rotation of the permanent magnet bar 330.

According to the embodiment as aforementioned, arrangement of the blade 184 facilitates substantially removal of residual toner particles. Friction between the blade 184 and the permanent magnet bar 330 serves to remove residual toner particles and to move them to the stay 343. Therefore there is no need to form a magnetic brush of residual toner particles on the surface of the permanent magnet bar 330 and to remove them therefrom. According to another aspect of the invention, there is no need to provide the blade 184.

According to a further embodiment, dual-component developing material alternating with one-component developing material is applied over the surface of the photosensitive drum 2.

According to a still further embodiment, the outer periphery of the rotating permanent magnet bar 330 is covered with a sleeve made of a magnetically impervious member such as aluminum or stainless steel, and is fixedly mounted to the apparatus housing 150. Its outer periphery may be adherently covered with a tube made of synthetic resin material. The outer periphery may be coated with plastic paint so as to serve for removal of residual toner particles from the permanent magnet bar 330 to the stay 343. Since residual toner particles 391 are electrically insulated from the permanent magnet bar 330 by the synthetic resin layers, they have a tendency to be attracted by the stay 343 despite an electrostatic force.

A magnetic field may be formed by an electromagnet alternating with the permanent magnet bar 330.

FIXING DEVICE 320

FIG. 30 is a simplified perspective view of the fixing device 320. A heat roller 350 and a pressure roller 351 are disposed above and below, respectively. The pressure roller 351 is rotated in the direction of arrow 353 and the heat roller 350 cooperates with the revolution of the pressure roller 351 in the direction of arrow 352. Accordingly a copy sheet 354 is forwarded along a transport path 335 by means of these rollers 350 and 351. A heater element 356 is supported in the heat roller 350, and extends along the entire length of the heat roller 350 so as to heat the heat roller 350.

A toner removal means 358 is disposed so as to remove residual toner particles remaining on the surface of the heat roller 350. The toner removal means 358 comprises a mounting member 359 extending parallel to the axis of the heat roller 350 and fixed to the apparatus housing 150. The mounting member 359 has an upper mounting portion 360 and a lower mounting portion 361, to which a toner removal member 362 is mounted. The toner removal member 362 comprises an elastic support plate 363 and a toner wiper 364 made of heat proof rubber material and abutting against the surface of the heat roller 350 along the entire longitudinal direction thereof.

Figure 31:
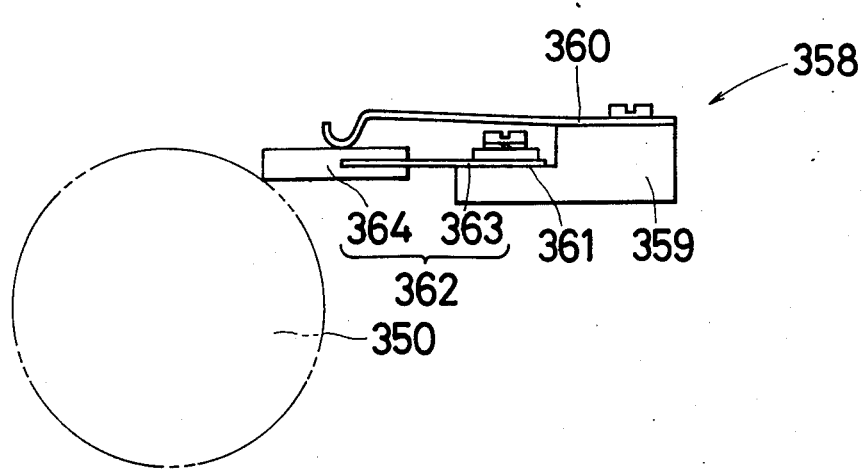
FIG. 31 is a simplified side view of a toner removal member.
Figure 32:
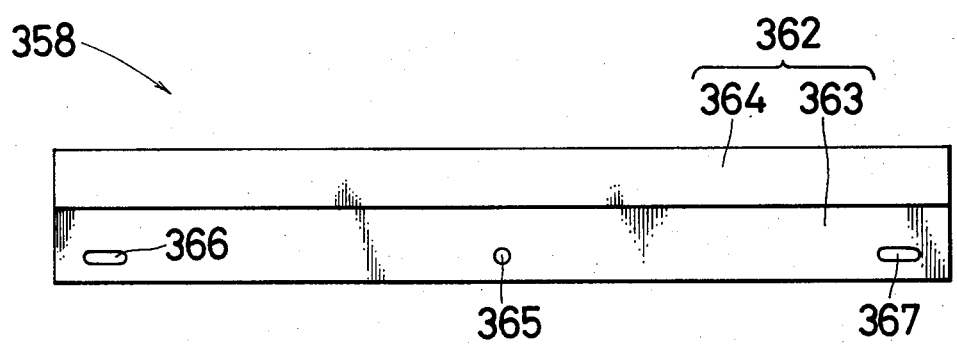
FIG. 32 is a plan view of the toner removal member.

FIG. 31 is a simplified side view of the toner removal means 358, and FIG. 32 is a plan view of the toner removal member 362. The support plate 363 has a mounting hole 365 at the longitudinal center of the support plate 363. The support plate 363 is fixedly secured to the lower mounting portion 361 of the mounting member 359 with a bolt penetrating through the mounting hole 365. Both ends of the support plate 363 have guide slots 366 and 367. These guide slots 366 and 367 are elongated in the direction of the longer side of the support plate 363 as shown in FIG. 32. A pin 368 (refer to FIG. 30) passing loosely through the guide slot 366 projects from the lower mounting portion 361 of the mounting member 359. A pin (not shown) projecting from the lower mounting portion 361 similarly passes loosely through the guide slot 367. In the case where the support plate 363 and the wiper 364 are subjected to the heat of the heater element 356, the pins 368 etc. and the guide slots 366 and 367 allow the support plate 363 to expand and contract along an axial line of the heat roller 350. Therefore the wiper 364 is substantially capable of abutting against the overall surface of the heat roller 350. The heat roller 350 is prevented from being affected adversely due to heat distortion.

There is provided a spring 370 to cause the wiper 364 to abut against the outer surface of the heat roller 350 elastically. The U-shaped spring 370 is composed of a pair of arms 371 and 372 extending toward the wiper 364 and a joint portion 373 to join arms 371 and 372. The arms 371 and 372 respectively have downwardly bending lip portions 374 and 375 which are in a U-shaped configuration as viewed in a vertical plane with respect to a line parallel to the heat roller 350. The joint portion 373 of the spring 370 is secured to the upper mounting portion 360 of the mounting member 359 by screws 376.

The spring 370 is mounted along a portion of the upper portion 360 of the mounting member 359 taken along on axial line of the heat roller 350. Lip portions 374 and 375 are biased by the arms 371 and 372 to press down the upper side of the wiper 364 against the periphery of the heat roller 350. Accordingly the wiper 364 is elastically in contact with the periphery of the heat roller 350. Still further this substantial contact is retained in alignment with the overall longer side of the heat roller 350. A plurality of the springs 370 are spaced in parallel with the heat roller 350 along the mounting member 359. Therefore, the springs 370 are prevented from being distorted due to heat from the heat element 356. Therefore the wiper 364 is biased by the arms 371 and 372 so as to abut against the periphery of the heat roller 350.

DRIVING OF TIMING PULSE

Figure 33:
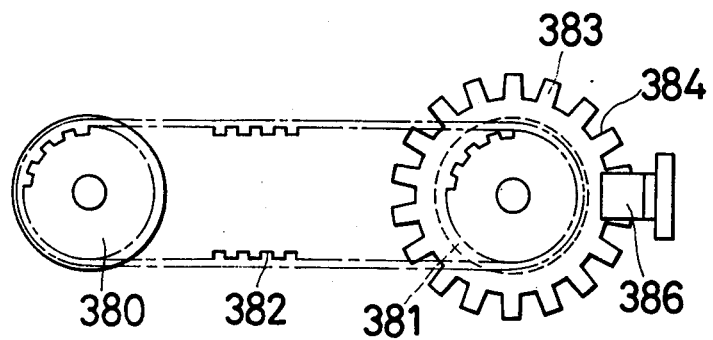
FIG. 33 is a front view of the driving mechanism for providing timing pulses to control the electrostatic copying apparatus.
Figure 34:
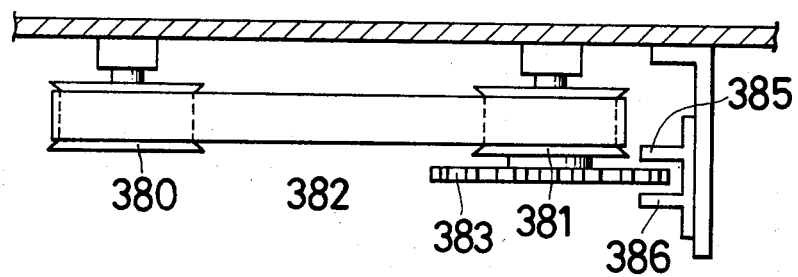
FIG. 34 is a plan view of the driving mechanism shown in FIG. 33.

FIG. 33 illustrates a front view of the driving mechanism for providing timing pulses to control the electrostatic copying apparatus, and FIG. 34 a plan view of FIG. 33. A timing belt 382 passes over a pulley 380 driven to rotate by means of a motor, and over a pulley 381. A circular timing plate 383 is coaxially fixed to the pulley 381. The circular timing plate 383 has a plurality of notches 384 at equal intervals circumferentially. These notches 384 are detected by an optical sensor which includes a light generating element 385 and a light receiving element 386. The output signal from the receiving element 386 controls the electrostatic copying apparatus.

What is claimed is:

1. In an electrostatic copying apparatus of the type wherein a stationary original document image is projected onto a photosensitive member during movement of an optical device for exposing the original document, an electrostatic latent image of toner particles is developed on said photosensitive member and is transferred at a transfer zone onto a copy sheet which is moved through the apparatus along a copy sheet transport path by a copy sheet transport arrangement, and the image transferred to said copy sheet is fixed thereon, the improvement wherein said copy sheet transport arrangement comprises:

upper and lower guide plates for guiding the copy sheet to abut said photosensitive member at said transfer zone;

means for biasing said guide plates toward each other;

a frame mounted to pivot at a downstream portion thereof about a horizontal axis;

copy sheet transport means mounted on said frame for transferring from said transfer zone the copy sheet having thereon the copied image;

support means for maintaining an upstream portion of said frame adjacent said transfer zone; and means for, upon downwardly pivoting said upstream portion of said frame about said axis, moving said lower guide plate away from said upper guide plate in the area of said transfer zone.

2. The improvement claimed in claim 1, further comprising a peeling member mounted above said frame for removing the copy sheet from said photosensitive member after a transfer operation, means for biasing said peeling member about a horizontal axis toward a peripheral surface of said photosensitive member, and means for moving said peeling member away from said peripheral surface against the force of said biasing means when said frame is pivoted downwardly.

3. The improvement claimed in claim 1, further comprising another pair of upper and lower guide plates positioned upstream of said first mentioned upper and lower guide plates, upper and lower carrying rollers positioned between said pairs of upper and lower guide plates for transferring the copy sheet therebetween, and upper and lower transport rollers for feeding the copy paper sheet between said second mentioned pair of upper and lower guide plates.

4. The improvement claimed in claim 3, further comprising means for electrically insulating the copy paper sheet from a housing of the copying apparatus, said means comprising said lower transport and carrying rollers and said second mentioned lower guide plate being formed of electrically insulative material, bearings formed of electrically insulative material mounting said upper transport and carrying rollers and said second mentioned upper guide plate to said housing, and support means formed of electrically insulative material mounting said first mentioned upper and lower guide plates to said housing.

* * * * *